United States Patent
Sharifi Mehr

(10) Patent No.: US 10,853,350 B1
(45) Date of Patent: Dec. 1, 2020

(54) SYSTEM FOR ASSOCIATING DATA POLICIES WITH DATA OBJECTS

(71) Applicant: AMAZON TECHNOLOGIES, INC., Seattle, WA (US)

(72) Inventor: Nima Sharifi Mehr, Vancouver (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 483 days.

(21) Appl. No.: 14/838,042

(22) Filed: Aug. 27, 2015

(51) Int. Cl.
G06F 16/23 (2019.01)
G06F 16/28 (2019.01)

(52) U.S. Cl.
CPC ........ *G06F 16/2365* (2019.01); *G06F 16/289* (2019.01)

(58) Field of Classification Search
CPC ......... G06F 17/30371; G06F 17/30607; G06F 17/30085; G06F 17/30551; G06Q 10/10
USPC ........................................................ 707/689
See application file for complete search history.

(56) References Cited

U.S. PATENT DOCUMENTS

| 2007/0156659 A1* | 7/2007 | Lim ..................... G06F 21/6227 |
| 2007/0214099 A1* | 9/2007 | Marfatia ................. G06Q 10/10 706/20 |
| 2008/0066148 A1* | 3/2008 | Lim ....................... G06Q 10/10 726/1 |
| 2009/0328219 A1* | 12/2009 | Narayanaswamy .......................... H04L 63/1425 726/23 |
| 2011/0078759 A1* | 3/2011 | Choi ..................... H04L 63/102 726/1 |
| 2013/0031037 A1* | 1/2013 | Brandt ................ H04L 63/1408 706/12 |
| 2014/0006354 A1* | 1/2014 | Parkison ........... G06F 17/30194 707/649 |
| 2014/0095449 A1* | 4/2014 | Marwah ............ G06F 17/30073 707/668 |
| 2014/0113653 A1* | 4/2014 | Wendling ............ H04L 41/0893 455/456.1 |
| 2015/0163121 A1* | 6/2015 | Mahaffey ............ G06F 11/0709 707/687 |

* cited by examiner

*Primary Examiner* — Hosain T Alam
*Assistant Examiner* — Nicholas E Allen
(74) *Attorney, Agent, or Firm* — Lindauer Law, PLLC

(57) ABSTRACT

Described are techniques for determining a data policy suitable for association with a data object based on the data access pattern for the data object. Correspondence between the data access pattern of the data object and pattern data, indicative of data access patterns stored in association with data policies, may be determined. Based on the correspondence between the data access pattern of the data object and a particular data access pattern of the pattern data, the data policy associated with the particular data access pattern may be suitable for use with the data object. A set of suitable data policies may be refined based on the content or metadata associated with the data object and the code or deployment status of services that access the data object. Once the access pattern for a data object is known, subsequent interactions with the data object may be analyzed to identify anomalous traffic.

20 Claims, 8 Drawing Sheets

SYSTEM FOR ASSOCIATING DATA POLICIES WITH DATA OBJECTS

BACKGROUND

Data policies may be used to purge unneeded data from data stores when no legal or business need requires continued retention of the data.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
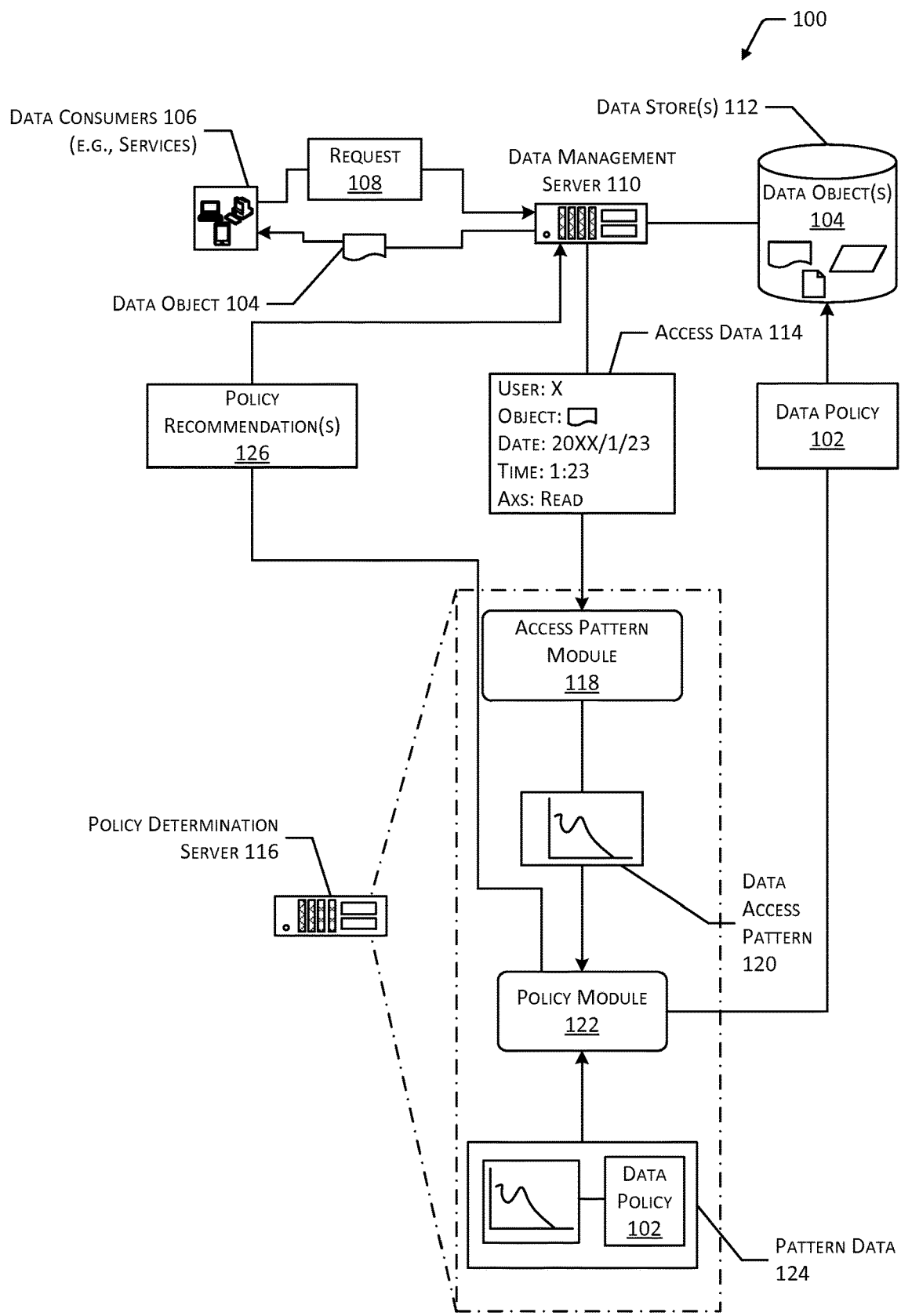
FIG. 1 depicts a system for associating data policies with data objects based on data access patterns for the data objects.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many types of data objects must be stored for a prescribed period of time after generation. For example, a legal requirement may prescribe that certain types of data be retained for five years, such as for tax or accounting purposes. Other types of data may be retained by a data owner for a selected period of time due to a business need of the data owner or of one or more consumers of the data. For example, lists containing client contact information may be retained by a business for thirty days. After the required or selected time periods have lapsed, the corresponding data may be deleted or otherwise removed from storage. To facilitate the management of large quantities of data, data owners may assign data polices to particular data objects. A data policy may indicate a particular time, such as thirty days after generation of a data object, and a particular action, such as deletion of the data object. Once the particular time occurs, the particular action may be undertaken. In some cases, data policies may be configured to automatically take such actions. In other cases, data policies may solicit user input prior to performing certain actions.

If the business need for various data objects is unknown, a data owner may refrain from assigning data policies to those data objects, resulting in those data objects being stored for extended periods of time or even indefinitely. Retention of unneeded data may consume storage space and computing resources. Additionally, retention of potentially sensitive or private data for extended periods of time may create risks with regard to the security of the data.

This disclosure relates to techniques for associating data policies with data objects based on a data access pattern of the data object. The data access pattern may include data determined from a data access log or other type of record indicative of users or services that access the data object. For example, a data access pattern for a data object may identify the users or services accessing the data object, the times at which the accesses occurred, the length of time during which the accesses occurred, and the manner in which the users or services interacted with the data object. Continuing the example, the data access pattern may indicate that a particular user read or modified a stored value within a data object at a particular date and time. As another example, the data access pattern may indicate that a particular service modifies a data object once per hour for ninety days after creation of a data object, then ceases to access the data object. Other types of interactions with a data object may include changing an access level for the data object (e.g., affecting the users or services that may access the data object); generating, revoking, or modifying credentials associated with accessing the data object; or encrypting or decrypting the data object.

Based on the data access pattern for a data object, a suitable data policy for association with that data object may be determined. For example, data policies may be stored in association with particular data access patterns common to files for which that data policy is suitable, as "pattern data". Correspondence between the data access pattern of the data object and a data access pattern of the pattern data may indicate one or more data policies that are suitable for use with that data object. Continuing the example, after a data object is generated, at least a portion of the instances when the data object is accessed may be used to determine the data access pattern for the data object. In some implementations, the data access pattern for the data object may be continuously or periodically compared to one or more of the data access patterns associated with the pattern data. If it is determined that the data access pattern for the data object corresponds to one or more of the data access patterns of the pattern data within a threshold level of confidence, a data policy that corresponds to one of the matched data access patterns may be suitable for association with the data object.

For example, when a data object is received or created, it may not be possible to determine the data access pattern for that data object initially. Over time, as users or services access the data object, these accesses may be used to determine a data access pattern for the data object. This data access pattern may be compared with one or more data access patterns of the pattern data, periodically or continuously, to determine the extent to which the data access pattern of the data object corresponds to the pattern data. Continuing the example, fifteen days after a data object is received or created, the data access pattern of the data object may appear to correspond to a particular data access pattern of the pattern data. The particular data access pattern of the pattern data may indicate that access to the data object will cease after sixty days. The extent to which the data access pattern of the data object matches that of the pattern data may be used to determine a level of confidence regarding the correspondence. If this level of confidence exceeds a threshold confidence value, one or more data policies associated with the matched data access pattern of the pattern data may be output to a device associated with the data owner. Responsive to user input confirming or selecting a data policy, the data policy may be associated with the data object. The user input may be provided by a human user, a computing device, a process executing on a computing device, and so forth. In other implementations, a data policy may be associated with a data object automatically, in the absence of user input.

The data policy may include one or more control actions to be undertaken with regard to the data object at one or more times. For example, the data access pattern corresponding to a data object may indicate that no service will access that data object after thirty days. The associated data policy may cause deletion of the data object thirty days after creation of the data object. As another example, a data policy may cause archival of a data object sixty days after no user or service has requested to access the data object. Archiving the data object may include moving the data object to a remote data store that may consume a smaller quantity of computing resources. As yet another example, a data policy may cause encryption of a data object thirty days after its creation based on a key not associated with the data owner. The encrypted data may be retained due to a legal requirement, such as a requirement that the data object be retained for a period of time (e.g., one year). The corresponding decryption key may be associated with a custodial account, a user associated with a legal department, and so forth. Encryption of the data object may include use of a symmetric-key or asymmetric (e.g., public) key algorithm. In some implementations, other cryptographic operations (e.g., hashing) or access controls may be used. For example, access to the data object may be restricted to certain digital certificates or other credentials, and the access credentials may be associated with the custodial account. As another example, a data string may be hashed, and the corresponding hash table or formula may be associated with the custodial account. After the period of time has lapsed, the data policy may then cause deletion of the data object. As another example, a data policy may cause increased monitoring of access to a data object. For example, for the first thirty days after creation of a data object, a data access log for the data object may be updated at a first rate, such as once per week. After thirty days have lapsed, the data access log may be updated at a more frequent rate, such as once per day. Increasing the monitoring rate of data access logs for data objects that have been stored for extended periods of time may increase the chance of determining anomalous activity or security risks associated with the data objects.

In some implementations, the data access pattern of a data object may correspond to multiple data access patterns of the pattern data. In other implementations, the corresponding data access pattern of the pattern data may have multiple data polices associated therewith. In such cases, multiple data policies may be output to a data owner for confirmation or selection. Responsive to user input selecting a particular data policy, the selected data policy may be associated with the data object. In other implementations, a particular data policy may be associated with a data object automatically, in the absence of user input, responsive to the level of confidence associated with a data policy.

Other characteristics of the data object or of the consumers of the data object may be used to increase the level of confidence in a data policy. In some implementations, the pattern data may also include data characteristics indicative of content or metadata associated with data objects. Correspondence between the content or metadata of a data object and that of the pattern data may be used to facilitate the determination of the data policy to be applied to that data object. For example, a particular data object may have a data access pattern that appears to correspond to multiple data access patterns of the pattern data. If a particular data access pattern of the pattern data is associated with a certain type of data object, then correspondence between the metadata of the data object and that of the pattern data may increase the level of confidence associated with that particular data access pattern. Therefore, multiple data objects that match the same data access pattern of the pattern data may be associated with different data policies, based on the content or metadata associated with the data objects.

In some implementations, characteristics of data consuming entities may be used to increase the level of confidence in a data policy. For example, code associated with one or more services that access a data object may be searched to determine references to the data object. If it is determined that one or more services that previously accessed the data object have been modified to remove a reference to the data object, such that those service(s) will no longer access the data object, this determination may affect the data policy that is associated with the data object. As another example, deployment schedules associated with one or more services that access a data object may be searched to determine deployment statuses of the service(s). If it is determined that the deployment statuses of one or more services that previously accessed the data object have been modified such that the service(s) will no longer access the data object, this determination may affect the data policy that is associated with the data object. Continuing these examples, if no services are configured to access a data object, a data policy that causes deletion, archival, or securing of the data object after a short time period may be suitable. In some implementations, a data policy may cause the revocation of access credentials associated with services that are no longer configured to access the data object.

After determining a data access pattern for a data object, that data access pattern may be used to determine anomalous attempts to access the data object. For example, subsequent attempts to access the data object after association of the data policy may be compared to the data access pattern. If correspondence between the subsequent accesses and the data access pattern is less than a threshold level of correspondence, this determination may indicate that the attempts to access the data object are anomalous (e.g., unauthorized or potentially malicious). Responsive to this determination, a notification may be provided to the data owner, access to the data object by one or more entities may be restricted, and so forth. In some implementations, if an external event, such as a modification to one or more services or deployment schedules, is determined, anomalous attempts to access a data object that correspond to this external event may be disregarded. In other implementations, responsive to a determination of an anomalous attempt to access a data object, a control action may be taken, such as encrypting the data object or otherwise increasing the security controls associated with the data object. As another example, responsive to a determination of an anomalous attempt to access a data object, the data object may be deleted or archived. In some implementations, the control action may include a user provided control action, such as execution of particular code or a particular process provided by a user responsive to detection of the anomalous attempt.

Implementations usable within the scope of the present disclosure may thereby facilitate the association of data policies with data objects by determining the data access pattern of the data objects. The association of a suitable data policy with data objects may prevent the unsecured retention of data for extended periods of time, which may consume computing resources and generate security concerns, while ensuring that data is retained pursuant to legal requirements, business needs, and so forth, as indicated by the data access pattern.

FIG. 1 depicts a system 100 for associating data policies 102 with data objects 104. Data objects 104 may include any manner of data, such as alphanumeric data, audio data, video data, image data, metadata, and so forth. For example, a data object 104 may include data relating to an item offered for sale, such as an image of the item, a price, a shipping cost, various characteristics of the item (dimensions, weight, materials, etc.), and so forth. As another example, a data object 104 may include data relating to a user account, such as a user's name, password, e-mail address, physical address, and so forth. As yet another example, a data object 104 may include shipping data, such as a table or list of users, clients, or other individuals, which may include names, e-mail addresses, physical addresses, telephone numbers, and so forth. In some implementations, data objects 104 may include sensitive or private information, such as social security numbers, personal identification numbers or passwords that may be used to access user accounts, financial information, and so forth. In some cases, a user's name or contact information (e.g., telephone number, e-mail address, or physical address) may also be considered sensitive or private information. In other cases, metadata associated with a data object 104 may indicate that the data object 104 contains sensitive or private information. Metadata may also be used to indicate a type or category corresponding to a data object 104 or the content of the data object 104.

One or more data consumers 106 may access selected data objects 104 by providing a request 108 to a data management server 110. The data management server 110 may communicate with one or more data stores 112 storing the data objects 104. Responsive to receipt of the request 108, the data management server 110 may provide access to the requested data object 104 to the requesting data consumer 106. The data consumer(s) 106 may include any manner of computing device associated with a user, a service, or another type of entity or software configured to interact with a data object 104. The data consumer(s) 106 may include computing devices such as mobile devices, set-top boxes, tablet computers, personal computers, wearable computers, servers, and so forth. The data management server 110 may include, but is not limited to, any of the types of computing devices described with reference to the data consumer(s) 106. Additionally, while FIG. 1 depicts a single data management server 110, in some implementations, the functions of the data management server 110 may be performed by multiple computing devices. The data store(s) 112 may use a flat file, database, linked list, tree, executable code, script, or other data structure to store information. The data store(s) 112 may include any number and any manner of storage medium.

As an example, a user associated with a mobile device may generate a request 108 to access and read or modify one or more values from a particular data object 104. Continuing the example, a user may modify information associated with a user account, which may be stored as the particular data object 104. As another example, a server executing a service may generate numerous requests 108 to access and update a value for a particular data object 104 over time. Continuing the example, the service may update a price or remaining quantity of an item periodically as various quantities of that item are sold. Data consumers 106 may interact with a data object 104 in a variety of ways including reading (e.g., viewing or receiving) the data object 104; writing (e.g., modifying or replacing) the data object 104; encrypting or decrypting the data object 104; generating, revoking, or modifying access credentials to access the data object 104; changing an access level for the data object 104; and so forth. During the lifetime of a data object 104, the particular data consumers 106 accessing the data object 104, the times at which the access occurred, and the type of interaction between the data consumer 106 and the data object 104 may be stored as access data 114.

A policy determination server 116 may determine the access data 114 from the data management server 110. The policy determination server 116 may include, but is not limited to, any of the types of computing devices described with reference to the data consumer(s) 106. While FIG. 1 depicts a single policy determination server 116, the functions of the policy determination server 116 may be performed by multiple computing devices. In other implementations, the policy determination server 116 may record the access data 114 directly rather than receiving the access data 114 from the data management server 110. In still other implementations, one or more of the functions performed by the policy determination server 116 may be performed by the data management server 110. For example, a single server or group of computing devices may perform the functions of both the data management server 110 and the policy determination server 116.

In some implementations, the data store(s) 112, one or more libraries used to access the data store(s) 112, or other computing devices in communication with the data store(s) 112 may be configured to generate logs or other types of files containing the access data 114. For example, if the data store(s) 112 are owned or managed by an entity unrelated to the policy determination server 116, the access data 114 may not be accessible to the policy determination server 116. As another example, entities unrelated to the policy determination server 116 may not generate access data 114. Alternatively, entities unrelated to the policy determination server 116 may generate access data 114 having insufficient information for determining a suitable data policy 102 for association with a data object 104. Instrumentation of the data store(s) 112, libraries, or other computing devices may facilitate generation of access data 114 usable by the policy determination server 116 to determine one or more data policies 102 for association with a data object 104.

An access pattern module 118 of the policy determination server 116 may determine the access data 114 associated with one or more data objects 104. Based at least partly on the access data 114, the access pattern module 118 may generate data access patterns 120 associated with the data objects 104. In some implementations, a data access pattern 120 may indicate a count of accesses or an access frequency for a particular data object 104 over time and may be used to predict future accesses to the data object 104. For example, a policy module 122 may determine correspondence between the data access pattern 120 of a data object 104 and one or more data access patterns 120 stored as pattern data 124. The pattern data 124 may include fixed, default, or selected data access patterns 120, stored in association with corresponding data policies 102. In some implementations, the pattern data 124 may include data access patterns 120 determined previously with regard to one or more data objects 104. Correspondence between a data access pattern 120 of a data object 104 and a data access pattern 120 of the pattern data 124 may indicate that the one or more data policies 102 associated with the data access pattern 120 of the pattern data 124 may be suitable for use with the data object 104.

The correspondence between a data access pattern 120 of a data object 104 and a data access pattern 120 of the pattern data 124 may include an indication of the degree of similarity between the data access patterns 120. Determination of a degree of similarity may include determining overlap or matching between accesses, performance of linear analysis or curve-fitting operations, and so forth. In some implementations, the correspondence between the data access pattern 120 of a data object 104 and the pattern data 124 may be expressed as a confidence value, such as a percentage of similarity or matching between data access patterns 120.

If the confidence value for the correspondence between the data access pattern 120 of a data object 104 and the pattern data 124 exceeds a threshold confidence value the policy module 122 may determine one or more data policies 102 suitable for use with the data object 104. Threshold confidence values may include fixed values, default values, values selected by user input, and so forth. For example, a data access pattern 120 of the pattern data 124 may include information indicative of ninety days of accesses, such as an identity of the accessing entities, the times at which the accesses occurred, and the types of interactions associated with the accesses. As a data object 104 is accessed, the data access pattern 120 for that data object 104 may be generated. Initially, the data access pattern 120 for that data object 104 may appear to correspond to one or more data access patterns 120 of the pattern data 124, but the confidence value for the correspondence may not exceed the threshold confidence value. Continuing the example, due to the fact that a recently-generated data object 104 has not existed for ninety days, determining correspondence between the data access pattern 120 for the data object 104 and the pattern data 124 may be limited to use of the initial portion of the data access pattern 120 of the pattern data 124. As time passes and the data access pattern 120 for the data object 104 is expanded to include data from subsequent time periods, the correspondence between the data access pattern 120 of the data object 104 and one or more data access patterns 120 of the pattern data 124 may increase.

In some implementations, the confidence value for the correspondence between the data access pattern 120 of the data object 104 and one or more particular data access patterns 120 of the pattern data 124 may be determined to exceed the threshold confidence value. Responsive to this determination, the policy module 122 may provide one or more policy recommendations 126 to the data management server 110. The policy recommendations 126 may be indicative of at least a subset of the data policies 102 that correspond to the particular data access patterns 120 of the pattern data 124. For example, if the data access pattern 120 of the data object 104 corresponds to multiple data access patterns 120 of the pattern data 124 with a confidence level that exceeds the threshold confidence level, the policy recommendations 126 may indicate the data policies 102 that correspond to each of the particular data access patterns 120 of the pattern data 124. As another example, the data access pattern 120 of the data object 104 may correspond to a single data access pattern 120 of the pattern data 124. That data access pattern 120 of the pattern data 124 may have multiple data policies 102 associated therewith. The policy recommendations 126 may indicate each of these data policies 102. As yet another example, the data access pattern 120 of the data object 104 may correspond to a single data access pattern 120 of the pattern data 124, which may have a single data policy 102 associated therewith. The policy recommendations 126 may be indicative of that single data policy 102.

Responsive to the policy recommendations 126, a user associated with the data management server 110 may provide user input selecting a data policy 102. In other implementations, the user input may indicate that none of the data policies 102 are suitable. In some cases, the user input may indicate a particular data policy 102 that was not presented using the policy recommendations 126. Responsive to the user input, a selected data policy 102 may be associated with the data object 104. In other implementations, the policy module 122 may associate a data policy 102 with a data object 104 independent of user input. A policy recommendation 126 (e.g., a notification) indicative of the data policy 102 that was used may be provided to the data management server 110. In other implementations, use of policy recommendations 126 may be omitted. For example, a user associated with the data management server 110 may provide user input indicating whether data policies 102 are to be automatically associated with data objects 104, or whether user input or confirmation is to be required prior to associating the data policies 102 with data objects 104.

Figure 2:
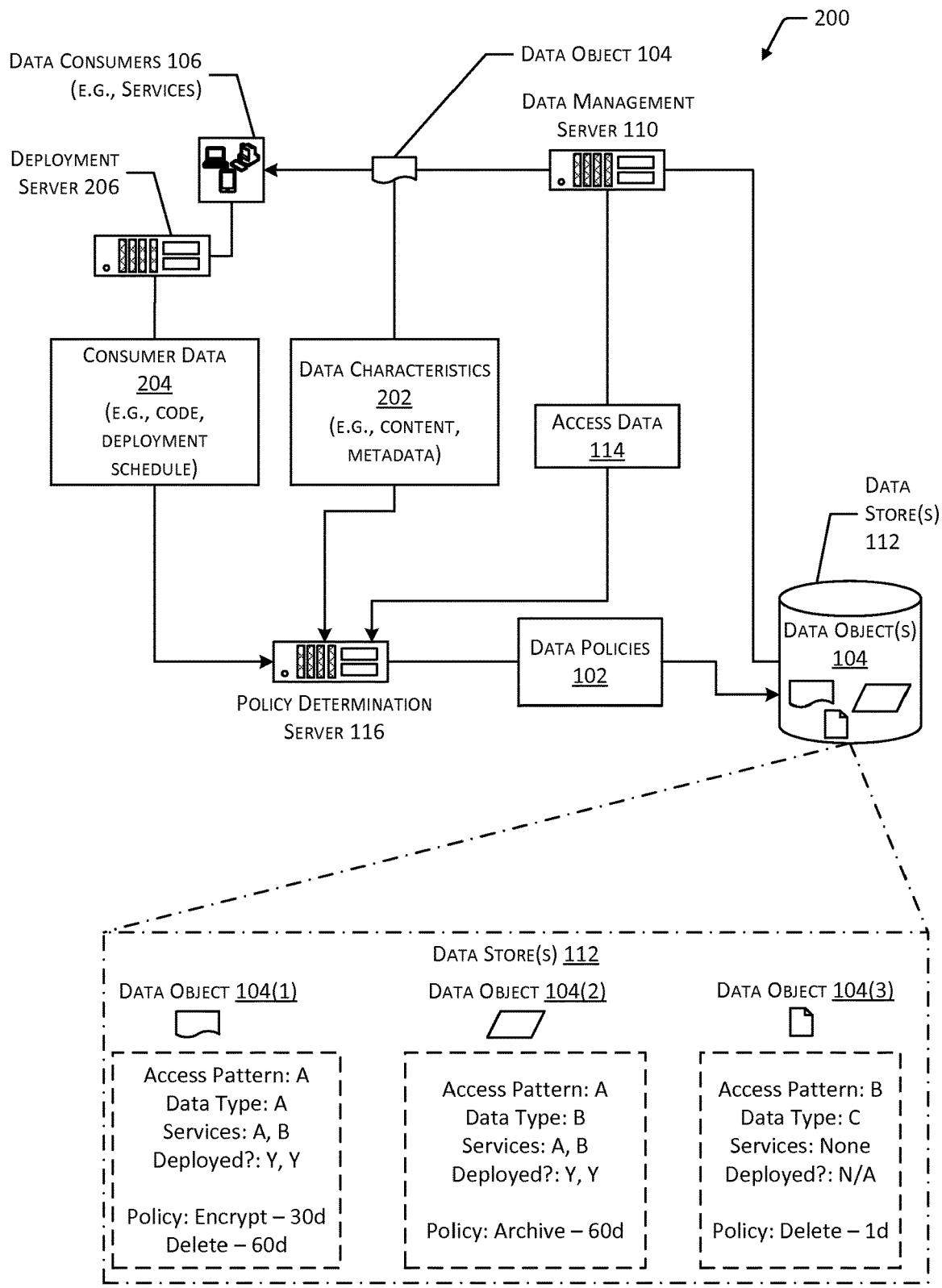
FIG. 2 depicts a system for associating data policies with data objects based on data access patterns for the data objects, characteristics of the data objects, and characteristics of data consumers of the data objects.

FIG. 2 depicts a system 200 for associating data policies 102 with data objects 104 based on data access patterns 120 for the data objects 104, characteristics of the data objects 104, and characteristics of data consumers 106 associated with the data objects 104. As described previously with regard to FIG. 1, a policy determination server 116 may determine access data 114 from a data management server 110 regarding one or more data objects 104. The access data 114 may include identifiers indicative of data consumers 106 that access the data objects 104, the times at which the accesses occur, and the manner in which the data consumers 106 interact with the data objects 104. The access data 114 for a particular data object 104 may be used to generate a data access pattern 120 for that data object 104. The data access pattern 120 may be used to determine a data policy 102 suitable for use with that data object 104 by determining correspondence between that data access pattern 120 and pattern data 124, which includes data access patterns 120 stored in association with data policies 102. Correspondence between a data access pattern 120 of a data object 104 and a particular data access pattern 120 of the pattern data 124 may indicate that the data policy 102 associated with the particular data access pattern 120 of the pattern data 124 is suitable for use with the data object 104.

By applying data policies 102 to data objects 104 based on the data access patterns 120 of the data objects 104, a set of data objects 104 may be divided into categories (e.g., containers, buckets, etc.) based on the data access patterns 120 of the data objects 104. For example, each data object 104 having the same data access pattern 120 may have the same data policy 102 associated therewith, due to the fact that the common data access pattern 120 for each data object 104 may indicate a similar business need for the data object 104. Continuing the example, a data access pattern 120 indicating that after thirty days, no service will continue to access a data object 104 may indicate that a data policy 102 for deleting the data object 104 after thirty days may be suitable. The suitability of a data policy 102 based on a data access pattern 120 may be indicated by the associations between the data policies 102 and data access patterns 120 of the pattern data 124.

In some implementations, data objects 104 having the same or similar data access patterns 120 may be associated with different data policies 102 based on other characteristics of the data object 104 or data consumers 106 of the data object 104. For example, the policy determination server 116 may determine data characteristics 202 of one or more data objects 104. The data characteristics 202 may include the content of a data object 104, such as values represented by alphanumeric data, sounds represented by audio data, colors, shapes, or objects represented by image data, and so forth. The data characteristics 202 may also include metadata associated with a data object 104, such as flags indicating whether a data object 104 includes private or sensitive data, metadata indicating a type or category corresponding to the data object 104, and so forth. In some implementations, the data characteristics 202 may indicate the type of data contained in a data object 104, such as alphanumeric data, image data, audio data, and so forth.

The data characteristics 202 of a data object 104 may affect the data policy 102 that is associated with the data object 104. For example, metadata associated with a data object 104 may indicate that the data object 104 contains data that is subject to a legal requirement or a business need that warrants retention, deletion, archival, or securing of the data object 104. Responsive to this determination, a data policy 102 that complies with the legal requirement or business need may be associated with the data object 104, independent of the data access pattern 120 of the data object 104. In some implementations, the pattern data 124 may include data characteristics 202 associated with one or more data policies 102. Correspondence between the data characteristics 202 of a data object 104 and one or more particular data characteristics 202 of the pattern data 124 may indicate that a data policy 102 associated with the particular data characteristics 202 of the pattern data 124 is suitable for use with the data object 104.

For example, FIG. 2 depicts the data store(s) 112 storing a first data object 104(1) and a second data object 104(2). Both the first data object 104(1) and the second data object 104(2) may be determined to have the same data access pattern 120 associated therewith (e.g., "Access Pattern: A"). Therefore, both the first data object 104(1) and the second data object 104(2) may be conceptually categorized in the same container or bucket, based on the common data access pattern 120. In some implementations, data objects 104 having the same data access pattern 120 may be associated with the same data policy 102. However, FIG. 2 depicts the first data object 104(1) having a first data type (e.g., "Data Type: A") and the second data object 104(2) having a second data type (e.g., "Data Type: B"). The data type of the data objects 104 may be determined based on the data characteristics 202 (e.g., the content, metadata, and so forth) associated with each data object 104. Based at least partly on the differing data types, the first data object 104(1) may be associated with a first data policy 102(1), while the second data object 104(2) is associated with a second data policy 102(2). Continuing the example, the first data object 104(1) may include a table or list of user data containing user contact information and passwords. To protect the privacy of the users, the data policy 102 associated with the first data object 104(1) may cause encryption of the first data object 104(1) thirty days after the first data object 104(1) is created. The data policy 102 associated with the first data object 104(1) may also cause deletion of the first data object 104(1) sixty days after the first data object 104(1) is created. The second data object 104(2) may include a user account for one or more particular users. Because a user may seek to access the user account at any time in the future, a data policy 102 that causes deletion of the user account may not be suitable. Based on the data type determined for the second data object 104(2), a data policy 102 that causes archival of the second data object 104(2) after sixty days may be associated with the second data object 104(2). Thus, based on information about data objects 104, determined from the data characteristics 202, multiple data objects 104 within the same container or bucket (e.g., having the same or a similar data access pattern 120) may be associated with different data policies 102.

In some implementations, consumer data 204 associated with one or more data consumers 106 may be determined. For example, consumer data 204 may include code associated with one or more services that access one or more of the data objects 104. Consumer data 204 may also include deployment schedules indicating the deployment status of one or more services that access the data objects 104. In some implementations, consumer data 204 may be determined from a deployment server 206 associated with the data consumers 106. For example, data consumers 106 may cause services associated with the deployment server 206 to be executed. In other implementations, consumer data 204 may be determined from the data consumers 106. Based on the consumer data 204 for at least a portion of the data consumers 106 that access the data store(s) 112, it may be determined that no service is currently configured to access a particular data object 102. For example, one or more services that previously accessed a data object 104 may have been modified to remove a reference to the data object 104 from the code of the service(s). As another example, the deployment schedule for one or more services that include a reference to a data object 104 may indicate that a service is not scheduled for future activity or currently active. In some implementations, responsive to a determination that no service is currently configured to access a data object 104, a data policy 102 that promptly deletes, archives, or secures the data object 104 may be used, independent of the data access pattern 120 of the data object 104. In other implementations, the pattern data 124 may include consumer characteristics associated with one or more data policies 102. Correspondence between the consumer data 204 associated with one or more data consumers 106 and a particular consumer characteristic of the pattern data 124 may indicate that the data policy 102 associated with the particular consumer characteristic is suitable for use with the data object 104 accessed by the data consumer(s) 106.

For example, FIG. 2 depicts the first data object 104(1) and the second data object 104(2) accessed by two services (e.g., "Services: A, B"), both services being currently active (e.g., "Deployed?: Y, Y"). FIG. 2 also depicts a third data object 104(3) that is not accessed by any services. Responsive to this determination, the policy module 122 may associate a data policy 102 with the third data object 104(3) that may cause prompt deletion of the third data object 104(3), such as within one day or less.

As illustrated by FIG. 2, the combination of one or more of: the data access pattern 120, data characteristics 202 for a data object 104, or the consumer data 204 for a data consumer 106 that accesses the data object 104, may be used to determine a data policy 102 to be applied to the data object 104.

Figure 3:
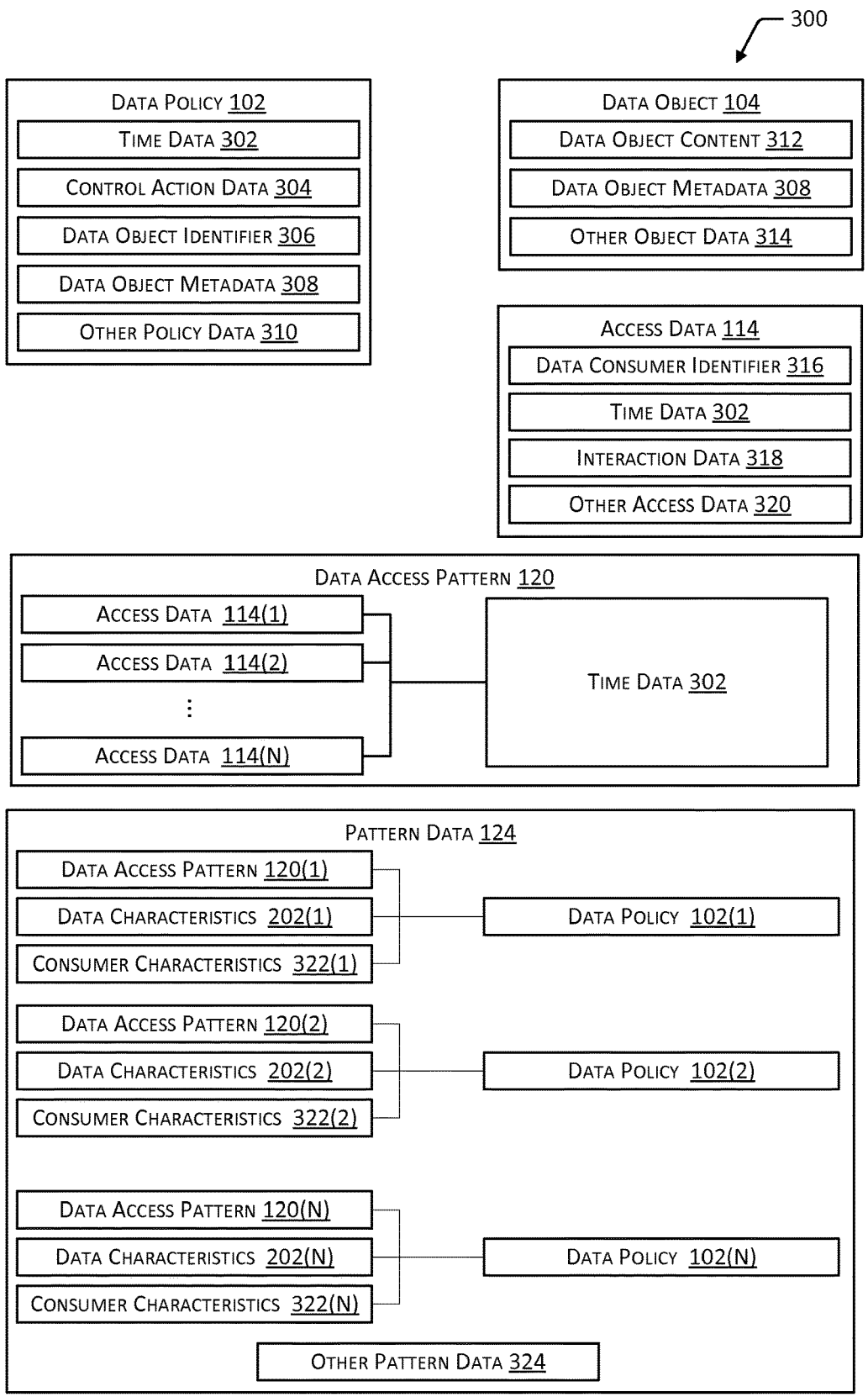
FIG. 3 depicts a block diagram illustrating examples of data policies, data objects, access data, data access patterns, and pattern data.

FIG. 3 depicts a block diagram 300 illustrating examples of data policies 102, data objects 104, access data 114, data access patterns 120, and pattern data 124.

Data policies 102 may be used to cause a control action to be taken with respect to a data object 104 at one or more times. For example, a data policy 102 may be configured to cause one or more control actions, such as deletion, archival, or securing of a data object 104, after the passage of a particular length of time from the creation of the data object 104. As another example, a data policy 102 may be configured to cause a control action to be taken after the passage of a particular length of time during which no attempts to access the data object 104 are made. As yet another example, a data policy 102 may be configured to cause a control action to be taken at one or more particular times, such as at the end of a year or the end of a quarter, independent of the times at which the data object 104 was created or accessed.

A data policy 102 may therefore include time data 302, indicative of one or more times at which a control action may be undertaken with regard to a data object 104. The time data 302 may indicate one or more times relative to the creation of a data object 104. For example, the time data 302 may indicate that a first control action (e.g., archival) is to be taken thirty days after generation of a data object 104 and that a second control action (e.g., deletion) is to be taken one year after generation of the data object 104. In other implementations, the time data 302 may indicate one or more times relative to the access of a data object 104. For example, the time data 302 may indicate that a control action is to be taken if a data object 104 is not accessed for sixty days (e.g., sixty days from the most recent access to the data object 104). In still other implementations, the time data 302 may indicate one or more fixed times, such as at the end of a year (e.g., December 31 at 11:59 P.M.), at the end of a quarter (e.g., March 31 at 11:59 P.M.), at the end of a month, at the end of a week, at the end of a day, and so forth. The time data 302 may indicate one or more particular times (e.g., Jul. 24, 2016 at 8:31 A.M.), such as times selected by a user.

A data policy 102 may also include control action data 304, which may be indicative of one or more control actions that may be undertaken at the times indicated by the time data 302. Control actions may include deletion of a data object 104. In other implementations, control actions may include archival of a data object 104, which may include moving the data object 104 to a remote storage medium that consumes fewer resources than the data store 112 originally storing the data object 104. In still other implementations, control actions may include securing a data object 104. For example, subsequent to a particular time indicated by the time data 302, a data object 104 may be encrypted, access to the data object 104 may be restricted to entities associated with particular credentials, and so forth. In other implementations, control actions may include a modification to a rate at which access data 114 for a data object 104 is determined. For example, access data 114 for a data object 104 may initially be determined at a first rate, such as once per week. After a length of time has elapsed, the data object 104 may be retained, but the rate at which the access data 114 is determined may be increased, such as to once per day, to increase the chance of detecting anomalous activity or other security risks with regard to the data object 104. As another example, access data 114 for a data object 104 may initially be determined at a first rate, such as once per day. After a length of time has elapsed, the data object 104 may be retained, but subject to less frequent accesses. The rate at which access data 114 is determined may be decreased, such as to once per month, to reduce computing resources expended to monitor unused data or data that is infrequently used or accessed.

The data policy 102 may also include one or more data object identifiers 306 indicative of the data objects 104 with which the data policy 102 has been associated. Data object identifiers 306 may include file names, flags or other indicators present in metadata associated with the data object(s) 104, a portion of the content of a data object 104, or other types of data (e.g., alphanumeric, image, or audio data) indicative of or associated with the data object 104.

The data policy 102 may further include data object metadata 308. For example, metadata associated with a data object 104 may indicate a type or category associated with the data object 104, the nature of the content of the data object 104, whether the data object 104 includes private or sensitive data for which enhanced security would be appropriate, and so forth. A data policy 102 may cause one or more control actions to be undertaken based at least partially on the data object metadata 308.

Other policy data 310 may include data indicative of legal requirements or business needs. For example, determination of a certain data object 104 or type of data object 104 may result in the application of a particular data policy 102 to that data object 104, independent of the data access pattern 120 or characteristics of the data consumers 106. Other policy data 310 may also include security information, such as credentials, certificates, encryption keys and schema, and so forth, which may be used to secure one or more data objects 104.

In some implementations, other policy data 310 may include device data indicative of the location or status of one or more devices storing data objects 104, or networks associated with such devices. For example, if a device storing a data object 104 is determined to be in a particular location (e.g., a foreign country that poses a security risk), the device is accessible to an unsecured network, or the status of the device becomes unsecure, the data policy 102 may cause a control action to be undertaken with regard to the data object 104. Continuing the example, a device that becomes accessible to an unsecured wireless network may delete, archive, or encrypt data objects 104 that are determined to be private or sensitive. As another example, the control action may include suppressing the existence of a data object 104 from a device that enters a country or other location that poses a security risk. Continuing the example, a user accessing a data store 112 using a device within an unsecure location may be unable to access the data object 104 or determine that the data object 104 is present in the data store 112. One or more indications of the presence of the data object 104 in the data store 112 may be suppressed from output to the device.

Data objects 104 may include any manner of data object content 312, which may include data indicative of the purpose or function of the data object 104. The data object content 312 may include one or more of alphanumeric data, audio data, video data, image data, metadata, and so forth. For example, data object content 312 may include information relating to items for sale, users, clients, financial transactions, locations or status of computing devices or data stores 112, locations or status of data objects 104, and so forth. In some implementations, the data object content 312 may include sensitive or private information, such as financial information, user passwords or pin numbers, user contact information, user social security numbers or other identifying information, and so forth. Determination of data object content 312 that may be suitable for enhanced security may affect the data policy 102 that is assigned to a data object 104. Data objects 104 may also include data object metadata 308. Data object metadata 308 may indicate a type or category corresponding to a data object 104, the nature of the data object content 312, whether the data object 104 includes sensitive or private information, and so forth.

Other object data 314 may include any manner of security feature, label, or other data that may affect the manner in which the data object 104 is transmitted, received, processed, and so forth. Other object data 314 may also include a size of the data object 104, a version of the data object 104, an indication of a number of versions of the data object 104 that may exist, and so forth.

Access data 114 may include data indicative of an entity, such as a user or service, accessing a data object 104. For example, the access data 114 for a data object 104 may include one or more data access logs indicative of the requests 108 for the data object 104. In some implementations, access data 114 may be determined by a policy determination server 116 in communication with one or more of the data store(s) 112 storing the data object(s) 104 or with the data management server 110. In other implementations, one or more data management servers 110, or another computing device in communication with the data store(s) 112 or the data management server(s) 110, may determine access data 114. For example, a computing device associated with a library for accessing the data store(s) 112 may be instrumented with computer instructions for logging access to one or more of the data objects 104. The access data 114 determined in this manner may be provided to the policy determination server 116 periodically or responsive to a request.

The access data 114 may include a data consumer identifier 316 indicative of the entity requesting access to the data object 104. The data consumer identifier 316 may include a device name, an Internet Protocol (IP) address, a Media Access Control (MAC) address, or any other manner of data (e.g., alphanumeric, image, audio, etc.) that may be used to differentiate a particular device, user, or service from other entities. For example, two different services that access a data object 104 may possess different data consumer identifiers 316, which may be used to differentiate the requests 108 and accesses associated with each service.

The access data 114 may also include time data 302 indicative of one or more of a time when a request 108 was received by a data management server 110, a time when access was granted, a time when access ended, or the length of time associated with access to a data object 104. In some implementations, the time data 302 may also indicate a frequency or rate at which a particular data consumer 106 requests 108 or accesses a data object 104.

The access data 114 may additionally include interaction data 318. Interaction data 318 may be indicative of the particular interactions between a data consumer 106 and a data object 104. For example, the interaction data 318 may indicate that an entity obtained read access to the data object 104 (e.g., for viewing at least a portion of the data object 104). As another example, the interaction data 318 may indicate that an entity obtained write access to the data object 104 (e.g., to replace, modify, or delete at least a portion of the data object 104). As yet another example, the interaction data 318 may indicate that an entity modified one or more security controls associated with the data object 104. Continuing the example, an entity may encrypt or decrypt the data object 104, change an access level or one or more credentials associated with the data object 104, and so forth.

Other access data 320 may include a rate at which the access data 114 is determined, specific dates and times at which the access data 114 is determined, and so forth. In some implementations, other access data 320 may also include specific types of access data 114 that are logged more frequently than other types of access data 114. For example, write accesses to particular values of a data object 104 may be logged more frequently than read accesses to a data object 104.

A data access pattern 120 may be generated based on the access data 114 for a particular data object 104 over a period of time. For example, the data access pattern 120 may associate access data 114 associated with multiple accesses to a data object 104 with time data 302 to generate an indication of the types of interactions with a data object 104 that occurred at particular times, the data consumers 106 associated with the access, and so forth. Data access patterns 120 may be dynamically modified over time, as additional requests 108 to access a data object 104 are received. For example, a data access pattern 120 may initially fail to correspond, within a threshold confidence level, to one or more data access patterns 120 of the pattern data 124. As additional access data 114 for a data object 104 is determined, the addition of the additional access data 114 to the data access pattern 120 may cause the data access pattern 120 to correspond to the pattern data 124. For example, FIG. 3 depicts a first access data 114(1), a second access data 114(2), and one or more other sets of access data 114(N), stored in association with time data 302 indicative of the times at which the accesses occurred. (As used herein, letters in parenthesis, such as "(N)" indicate any integer value.) Over time, additional access data 114 may be added to the data access pattern 120.

Pattern data 124 may include data policies 102 stored in association with data access patterns 120. Correspondence between a data access pattern 120 of a data object 104 and a particular data access pattern 120 of the pattern data 124 may be determined. The correspondence may indicate that the data policy 102 associated with the particular data access pattern 120 of the pattern data 124 is suitable for use with the data object 104. As described previously with regard to FIG. 2, pattern data 124 may also include data characteristics 202 of data objects 104 and consumer characteristics 322 of data consumers 106 stored in association with data policies 102. In some implementations, different combinations of data access patterns 120, data characteristics 202, and consumer characteristics 322 may be associated with different data policies 102.

For example, FIG. 3 depicts a first data policy 102(1) stored in association with a first data access pattern 120(1), one or more first data characteristics 202(1), and one or more first consumer characteristics 322(1). The first data policy 102(1) may include one or more control actions to be undertaken with regard to a data object 104 at one or more times. The control actions and times associated with the first data policy 102(1) may be based on the time and manner in which a data object 104 is accessed, indicated by the first data access pattern 120(1). The control actions and times associated with the first data policy 102(1) may also be based on the data object content 312 or data object metadata 308 indicated by the first data characteristics 202(1). The control actions and times associated with the first data policy 102(1) may also be based on the code, deployment, or other traits of the data consumers 106 indicated by the first consumer characteristics 322(1). For example, a first data access pattern 120(1) indicating that a data object 104 will not be accessed more than sixty days after its generation may be associated with a first data policy 102(1) that will cause deletion of the data object 104 after that time. First data characteristics 202(1) indicating that a data object 104 contains sensitive or private information may be associated with a first data policy 102(1) that will only retain the data object 104 for a short period of time prior to deleting or securing the data object 104. First consumer characteristics 322(1) indicating that no service is currently configured to access a data object 104 may be associated with a first data policy 102(1) that will cause deletion of the data object 104.

A second data policy 102(2) may be stored in association with a second data access pattern 120(2), one or more second data characteristics 202(2), and one or more second consumer characteristics 322(2). Any number of additional data policies 102(N) may also be stored in association with additional data access patterns 120(N), additional data characteristics 202(N), and additional consumer characteristics 322(N). While FIG. 3 depicts each data access pattern 120, set of data characteristics 202, and set of consumer characteristics 322 associated with a single data policy 102, in some implementations, multiple data policies 102 may be associated with data access patterns 120, data characteristics 202, or consumer characteristics 322.

Other pattern data 324 may include encryption schema or keys, credentials or certificates for use accessing particular data objects 104, and so forth. Other pattern data 324 may also include legal requirements, business needs, or user input that may be used to associate a data policy 102 with a data object 104 independent of the corresponding data access pattern 120, data characteristics 202, or consumer characteristics 322.

Figure 4:
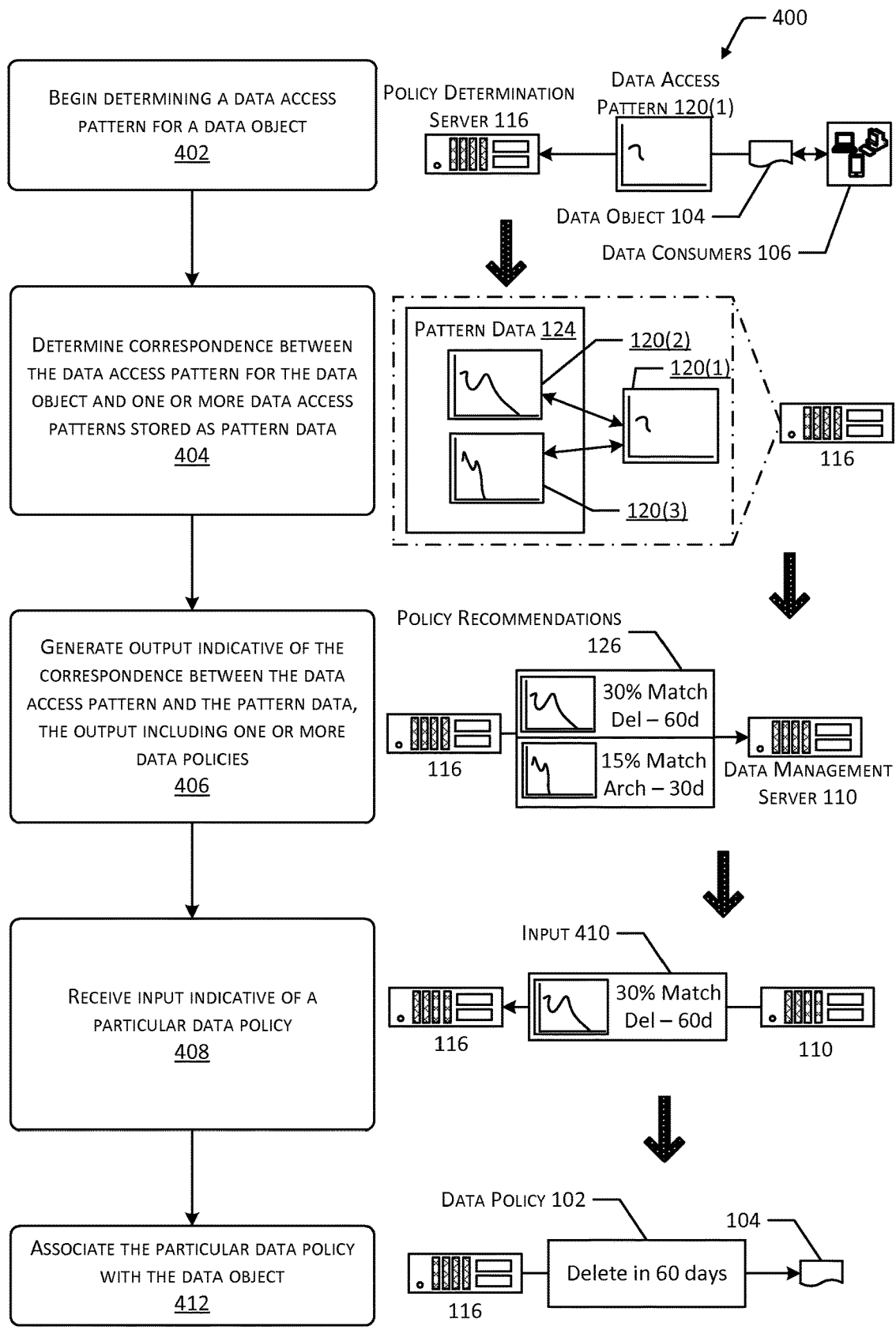
FIG. 4 illustrates a method for determining one or more data policies for use with a data object based on the data access pattern of the data object.

FIG. 4 illustrates a method 400 for determining one or more data policies 102 for use with a data object 104 based on the data access pattern 120 of the data object 104. At 402, a policy determination server 116 may begin determining a first data access pattern 120(1) for a data object 104. As described previously with regard to FIG. 1, one or more data consumers 106 may provide one or more requests 108 to obtain access to a data object 104. The policy determination server 116 may determine access data 114 indicative of the identity of the data consumer(s) 106 requesting access, the time at which the request 108 is made or at which access is granted, the type of interaction between the data consumer(s) 106 and the data object 104, and so forth. In some implementations, the access data 114 may be determined by one or more of: computing device(s) associated with data consumer(s) 106, computing device(s) associated with a data store 112 storing the data object 104, computing devices in communication with libraries (e.g., application programming interfaces (API) or other types of code) used to access the data store 112, or a data management server 110. In other implementations, the policy determination server 116 may determine the access data 114 directly. An access pattern module 118 associated with the policy determination server 116 may generate a first data access pattern 120(1) based on the access data 114. Shortly after generation of the data object 104, the first data access pattern 120(1) may include data from only a short period of time. However, over time, as data consumers 106 continue to access the data object 104, the first data access pattern 120(1) may be expanded to include additional data from additional time periods.

At 404, the policy determination server 116 may determine correspondence between the first data access pattern 120(1) for the data object 104 and one or more data access patterns 120(2-3) of the pattern data 124. In some cases, the first data access pattern 120(1) of the data object 104 may correspond to multiple data access patterns 120 of the pattern data 124. For example, FIG. 4 depicts the pattern data 124 including a second data access pattern 120(2) and a third data access pattern 120(3), both of which correspond to the first data access pattern 120(1) of the data object 104. The first data access pattern 120(1) may appear to match the initial portion of multiple data access patterns 120 of the pattern data 124 because the first data access pattern 120(1) of the data object 104 includes data for a generally short period of time. Over time, as additional access data 114 is used to expand the first data access pattern 120(1) of the data object 104, correspondence between the first data access pattern 120(1) and one or more data access patterns 120 of the pattern data 124 may increase or decrease. The correspondence between the first data access pattern 120(1) of the data object 104 and the data access pattern(s) 120 of the pattern data 124 may be expressed as a level of confidence, such as a percentage indicator of the degree to which the first data access pattern 120(1) of the data object 104 matches one or more data access pattern(s) 120 of the pattern data 124.

In some implementations, the first data access pattern 120(1) of the data object 104 may be expanded and monitored until correspondence between the first data access pattern 120(1) of the data object 104 and one or more data access patterns 120 of the pattern data 124 reaches a threshold confidence value. For example, the threshold confidence value may include as 50% confidence or greater. However, in other implementations, data indicative of the correspondence between the first data access pattern 120(1) and one or more other data access patterns 120 of the pattern data 124 may be output to a data owner periodically, continuously, or responsive to a request from the data owner, independent of the threshold confidence value. For example, at 406, output (e.g., policy recommendations 126) indicative of the correspondence between the first data access pattern 120(1) and the pattern data 124 may be generated, the output including one or more data policies 102. The output may be provided to the data management server 110 or to another computing device in communication therewith. FIG. 4 depicts policy recommendations 126 indicating that the second data access pattern 120(2) of the pattern data 124 corresponds to the first data access pattern 120(1) of the data object 104 with a first level of confidence (e.g., "30% Match"). FIG. 4 further depicts the third data access pattern 120(3) of the pattern data 124 corresponding to the first data access pattern 120(1) of the data object 104 with a second level of confidence (e.g., "15% Match"). Each of the second data access pattern 120(2) and the third data access pattern 120(3) may have a data policy 102 associated therewith. For example, the second data access pattern 120(2) may be associated with a data policy 102 that causes deletion of data objects 104 sixty days after creation (e.g., "Del—60 d"). The third data access pattern 120(3) may be associated with a data policy 102 that causes archival of data objects 104 thirty days after creation (e.g., "Arch—30 d").

Responsive to the policy recommendations 126 that are output, a user may select from one or more of the data policies 102 or from one or more of the matched data access patterns 120 included in the policy recommendations 126. At 408, the policy determination server 116 may receive user input 410 indicative of a particular data policy 102. For example, the policy recommendations 126 may include one or more of: an indication of the second data access pattern 120(2) or third data access pattern 120(3), an indication of the corresponding data policies 102, or an indication of the level of confidence associated with each matched data access pattern 120. In some implementations, a user associated with the data management server 110 may select one of the data policies 102 indicated in the policy recommendations 126 for association with the data object 104. The user associated with the data management server 110 may include a human user, a computing device, a process executing on a computing device, and so forth. In other implementations, the user input 410 may include a data policy 102 other than those indicated by the policy recommendations 126. For example, the user input 410 may include one or more modifications to one of the presented data policies 102 or an alternate data policy 102 different from those that are presented. In some implementations, the user input 410 may include an indication of the data policy 102 to be associated with the data object 104, accompanied by a delay period. For example, a data access pattern 120 for a data object 104 may appear to match a particular data access pattern 120 of the pattern data 124. However, the confidence value associated with the match may not exceed a threshold. A user may select a particular data policy 102, but may indicate that the data policy 102 is to be applied after a certain time period (e.g., twenty days) and only if the data access pattern 120 of the data object 104 does not deviate from the associated data access pattern 120 of the pattern data 124. As another example, a user may select a particular data policy 102, but may indicate that the data policy 102 is to be applied after the confidence level associated with the match between the data access pattern 120 of the data object 104 and the pattern data 124 exceeds a threshold value.

At 412, responsive to the user input 410, the selected data policy 102 may be associated with the data object 104. The data policy 102 may include one or more control actions to be undertaken at one or more times. When it is determined that a time associated with the data policy 102 has occurred, the data policy 102 may cause the corresponding control action to be undertaken. For example, when it is determined that sixty days have lapsed since the generation of the data object 104, the data policy 102 may cause deletion of the data object 104.

Figure 5:
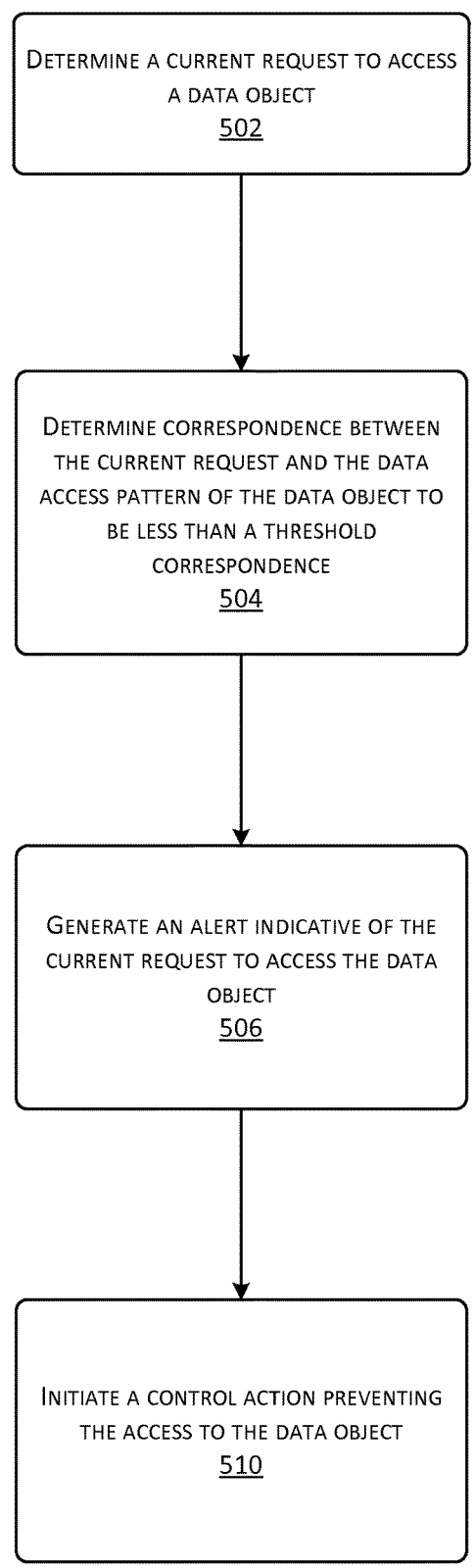
FIG. 5 illustrates a method for determining a potentially anomalous request to access a data object based on the data access pattern of the data object.
Figure 5:
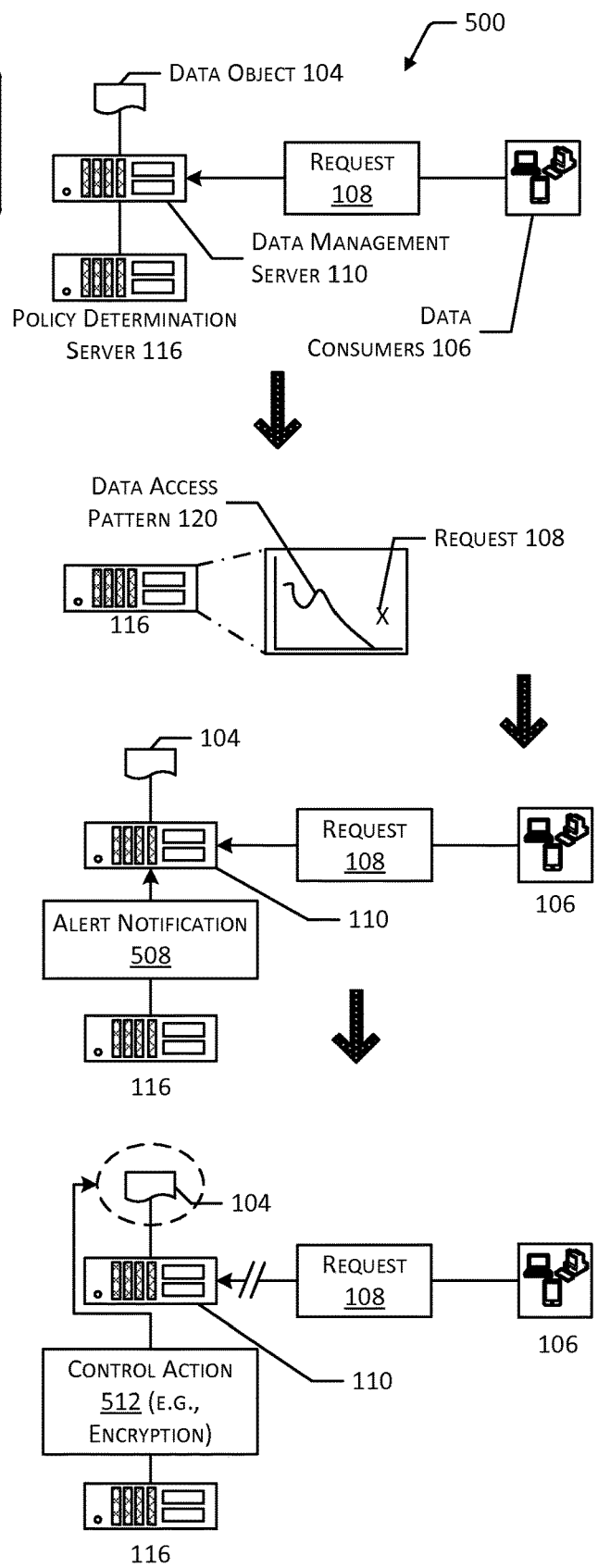

FIG. 5 illustrates a method 500 for determining a potentially anomalous request 108 to access a data object 104 based on the data access pattern 120 of the data object 104. For example, after a data policy 102 has been associated with a data object 104, the data access pattern 120 that corresponds to that data policy 102 (e.g., within the pattern data 124) may also be associated with the data object 104. In other implementations, the data access pattern 120 of the data object 104 may be determined based on accesses to the data object 104 that occur over time.

At 502, a request 108 to access a data object 104 is determined. For example, one or more data consumers 106 may provide a request 108 to a data management server 110 to access a data object 104. In some implementations, the policy determination server 116 may then determine the request 108 from the data management server 110. In other implementations, the data management server 110, or another computing device in communication therewith, may perform the method 500 illustrated in FIG. 5, and a separate policy determination server 116 may be omitted.

At 504, correspondence between the current request 108 and the data access pattern 120 associated with the data object 104 may be determined to be less than a threshold correspondence. For example, the current request 108 may be associated with a data consumer 106 that has not previously accessed the data object 104 or that, based on the data access pattern 120, would not typically access the data object 104 at the current time. As another example, the current request 108 may include a type of interaction with the data object 104 that deviates from the types of interaction indicated by the data access pattern 120 at the current time within the lifecycle of the data object 104. The lifecycle of a data object 104 may include a timeline of control actions to be performed with regard to the data object 104 at one or more times, indicated by the data policy 102. The threshold correspondence by which a request 108 may be permitted to deviate from a data access pattern 120 may be selected by a user or may include one or more fixed or default values. For example, a request 108 that occurs one day before or after a time when such requests 108 are expected to occur, based on the data access pattern 120 for a data object 104 having a ninety-day lifecycle, may be accepted. However, a request 108 that is received from an unknown entity that is not indicated in the data access pattern 120 at any time may indicate potentially anomalous traffic.

At 506, an alert notification 508 indicative of the current request 108 to access the data object 104 may be generated. For example, the policy determination server 116 may provide an alert notification 508 to the data management server 110, or another computing device associated therewith, to alert a data owner regarding the request 108. If the request 108 is not anomalous, the data owner may provide user input 410 indicative of this fact, and access may be granted to the data consumer 106. For example, if a new service is generated or an existing service is modified to begin accessing a particular data object 104, this may result in a legitimate change in the data access pattern 120 for that data object 104 rather than anomalous or malicious traffic. In some implementations, the data access pattern 120 may be modified based on one or more of the user input 410, subsequent accesses to the data object 104, consumer data 204 associated with the data consumers 106, and so forth. If the request 108 is anomalous, the data owner may provide user input 410 indicative of this fact, and access may be denied to the data consumer 106. In some implementations, one or more additional actions may be taken to secure the data object 104. For example, the data object 104 may be moved, encrypted, or otherwise secured, access credentials to the requesting entity may be revoked, and so forth. In other implementations, one or more additional actions may be performed automatically by one or more of the data management server 110 or the policy determination server 116, in the absence of user input 410. For example, the generation of the alert notification 508 may be omitted in some cases.

At 510, one or more control actions 512 may be initiated to prevent the requested access to the data object 104. For example, the control actions 512 may include deleting the data object 104, moving or archiving the data object 104, or securing the data object 104. Continuing the example, the data object 104 may be encrypted, an access level associated with the data object 104 may be modified, access to the data object 104 may be restricted to particular access credentials, and so forth. As another example, credentials associated with the data consumer 106 providing the anomalous request 108 may be revoked, the data consumer 106 may be restricted from providing subsequent traffic to the data management server 110, and so forth. As yet another example, the control action(s) 512 may include one or more user provided actions, such as code or a process provided or indicated by user input 410.

Figure 6:
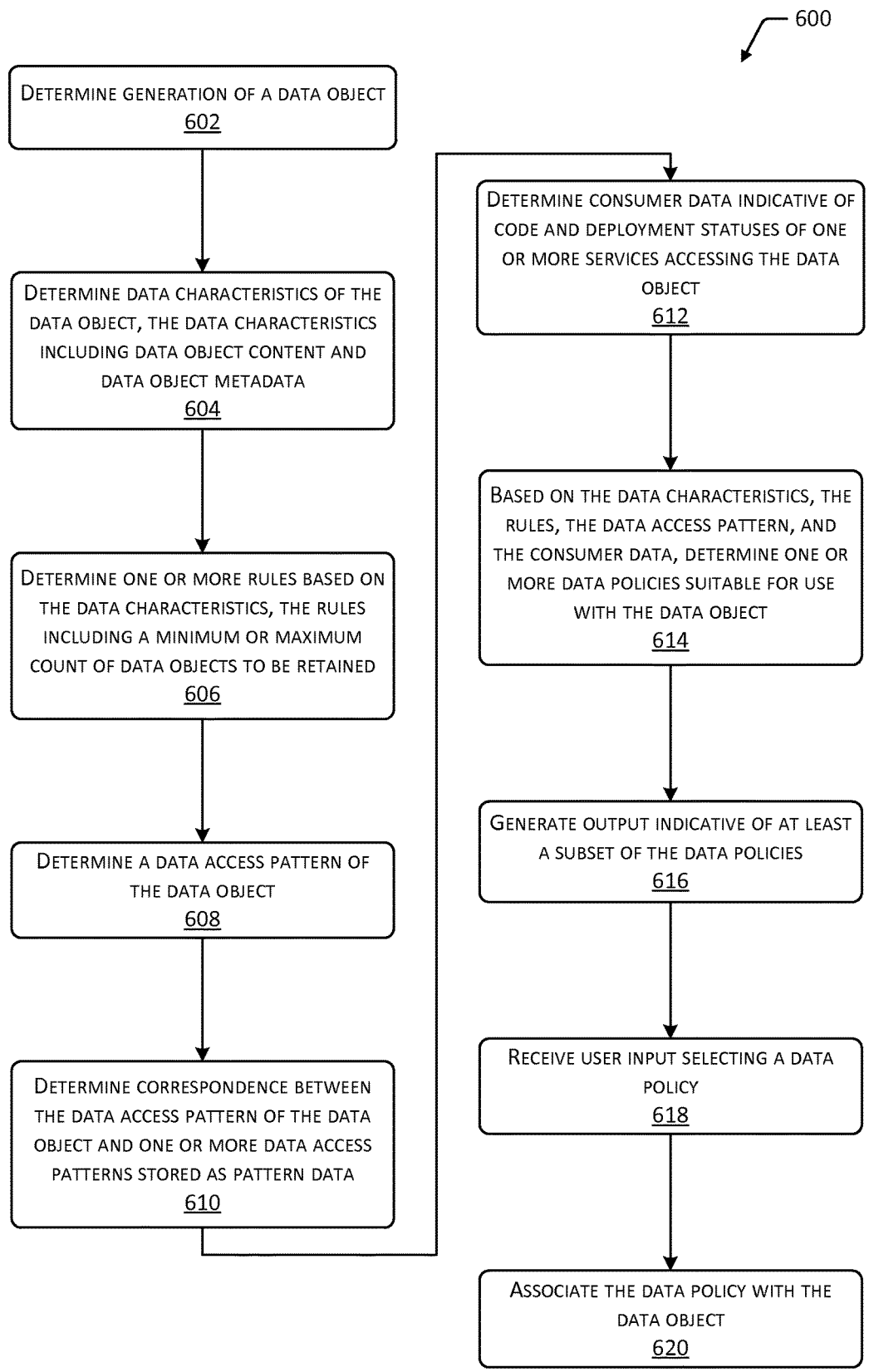
FIG. 6 is a flow diagram illustrating a method for determining a data policy for association with a data object based on data characteristics, rules, data access patterns, and consumer data.

FIG. 6 is a flow diagram 600 illustrating a method for determining a data policy 102 for association with a data object 104 based on data characteristics 202, consumer data 204, one or more rules, and data access patterns 120.

Block 602 determines generation of a data object 104. Data objects 104 may be generated by one or more users, services, or other entities. In some implementations, a data object 104 may be generated based on an interaction with a different data object 104. In other implementations, data objects 104 may be generated periodically or continuously based on operations of a system 100 or one or more particular computing devices. Data objects 104 may include any manner of data, including, but not limited to, alphanumeric data, audio data, image data, metadata, and so forth.

Block 604 determines data characteristics 202 of the data object 104. The data characteristics 202 may include data object content 312 and data object metadata 308. In some implementations, one or more of the data object content 312 or the data object metadata 308 may be used to determine a type or category associated with the data object 104. In other implementations, one or more of the data object content 312 or the data object metadata 308 may be used to determine whether the data object 104 includes sensitive or private data, or other types of data that may be associated with particular processing steps or security controls.

Block 606 determines one or more rules based on the data characteristics 202. In some implementations, the rules may be indicative of legal requirements or business needs. For example, a legal requirement may indicate that data objects 104 of a particular type or that include particular content must be retained for a prescribed period of time. A business need may indicate that users associated with a business entity may benefit from retaining the data object 104 for a selected period of time. In some cases, responsive to determination of a legal requirement or business need, a data policy 102 that includes control actions 512 and times that comply with the legal requirement or business need may be associated with the data object 104. In other implementations, the rules may include a minimum or maximum count of data objects 104 to be retained. For example, a rule may indicate that a specific number of the most recent data records of a certain type (e.g., twenty data objects 104) should be retained, independent of the time that the data objects 104 were created or accessed. As another example, a rule may indicate that data of a specific size (e.g., twenty gigabytes) should be retained, independent of the time that the data objects 104 were created or accessed or the number of data objects 104 retained to reach the specific size. As yet another example, a rule may indicate that a maximum count of data objects 104 or a maximum size (e.g., quantity) of data should be retained. If a data object 104 is generated that exceeds the indicated count or size, one or more data objects 104 (e.g., the data objects 104 received least recently) may be deleted or archived, independent of the time that the data objects 104 were created or accessed.

Block 608 determines a data access pattern 120 of the data object 104. As one or more data consumers 106 access the data object 104 over time, access data 114 indicative of the accessing data consumer 106, the time at which the access occurred, and the type(s) of interaction between the data consumer 106 and the data object 104 may be determined. The access data 114 may be used to generate a data access pattern 120 indicative of one or more of the entities, interactions, times, or frequencies of access associated with the data object 104.

Block 610 determines correspondence between the data access pattern 120 of the data object 104 and one or more data access patterns 120 stored as pattern data 124. As described previously with regard to FIG. 1 and FIG. 3, pattern data 124 may include data access patterns 120 stored in association with data policies 102. Correspondence between a data access pattern 120 of a data object 104 and a particular data access pattern 120 of the pattern data 124 may indicate that the data policy 102 associated with the particular data access pattern 120 is suitable for use with the data object 104. In some implementations, determining correspondence between the data access pattern 120 of a data object 104 and one or more data access patterns 120 of the pattern data 124 may include determining a confidence value associated with the correspondence. For example, the confidence value may indicate the extent to which the data access pattern 120 of the data object 104 matches a data access pattern 120 of the pattern data 124.

Block 612 determines consumer data 204 indicative of code and deployment statuses of one or more services accessing the data object 104. For example, one or more of the policy determination server 116 or the data management server 110 may access a log of services that have previously accessed a data object 104 to determine code or deployment schedules associated with those services. Continuing the example, the source code of services may be periodically or continuously queried by the policy determination server 116 or the data management server 110 to determine whether a particular service is configured to access a data object 104. In some implementations, a service configured to access a data object 104 may be continuously or periodically queried to determine whether a modification to the code of the service has occurred that would cause the service to no longer access the data object 104. As another example, the deployment statuses of services may be periodically or continuously queried to determine whether a particular service is currently active (e.g., deployed or in production). In some implementations, the deployment status of a service configured to access a data object 104 may be continuously or periodically queried to determine whether that service has been retired and may no longer access the data object 104, such as if there has been a modification to the deployment status.

Block 614 determines one or more data policies 102 that may be suitable for use with the data object 104. The data policies 102 may be determined based on one or more of the following: the data characteristics 202 of the data object 104; one or more rules associated with the data object 104; the data access pattern 120 of the data object 104; correspondence between the data access pattern 120 of the data object 104 and the pattern data 124; or consumer data 204 corresponding to data consumers 106 accessing the data object 104. For example, as described with regard to FIG. 1, correspondence between a data access pattern 120 of a data object 104 and a particular data access pattern 120 of the pattern data 124 may indicate that the data policy 102 associated with the particular data access pattern 120 of the pattern data 124 is suitable for use with the data object 104. However, if a rule indicative of a legal requirement or a business need requires retention of a data object 104 for a period of time, a data policy 102 may first cause retention of the data object 104 for the prescribed period of time, then perform the control actions 512 associated with the particular data access pattern 120 of the pattern data 124. As described with regard to FIG. 2, multiple possible data policies 102 may be stored in association with a particular data access pattern 120 of the pattern data 124. A single data policy 102 may be determined to be suitable for use with the data object 104 based on the data characteristics 202, such as the type of information contained in the data object 104. For example, a data policy 102 that increases security controls for a data object 104 or that deletes a data object 104 after a short period of time may be suitable for use when a data object 104 includes private or sensitive information. As another example, a data policy 102 that retains a data object 104 indefinitely, but archives the data object 104 in remote storage that consumes a lower quantity of resources, may be suitable for use with data objects 104 that include user account information. In some implementations, if it is determined that no service is currently configured to access a data object 104, data policies 102 that cause prompt deletion or archival of the data object 104 may be suitable for use with the data object 104.

Block 616 generates output indicative of at least a subset of the data policies 102. For example, policy recommendations 126 may be provided to a computing device associated with an owner of the data object 104. The policy recommendations 126 may indicate characteristics of one or more data policies 102 (e.g., one or more control actions 512 to be taken at one or more times). In some implementations, the policy recommendations 126 may include additional information, such as explanations or reasons for the suitability of one or more data policies 102. For example, if one or more services that previously accessed a data object 104 are no longer configured to do this, this information may be included in the policy recommendations 126 to enable a data owner to consider the information when selecting a data policy 102. As another example, if it is determined that the data object 104 includes a particular type of data (e.g., confidential or classified information), this information may be included in the policy recommendations 126.

Block 618 receives user input 410 selecting a data policy 102. The user input 410 may include an indication of one of the data policies 102 included in the policy recommendations 126. As described previously with regard to FIG. 4, the user input 410 may be provided by a human user, a computing device, a process executing on a computing device, and so forth. In some implementations, the user input 410 may modify one of the data policies 102 in the policy recommendations 126 or select a data policy 102 unrelated to the policy recommendations 126. Responsive to the user input 410, the policy determination server 116 may apply machine-learning to modify future policy recommendations 126. For example, if a data owner consistently selects a data policy 102 for a particular type of data object 104 independent of the correspondence between the data access pattern 120 for that data object 104 and the pattern data 124, threshold values corresponding to the data access pattern 120 for that data policy 102 may be modified. In other implementations, the data access pattern 120 for the data policy 102 may be modified. Block 620 associates the selected data policy 102 with the data object 104.

Figure 7:
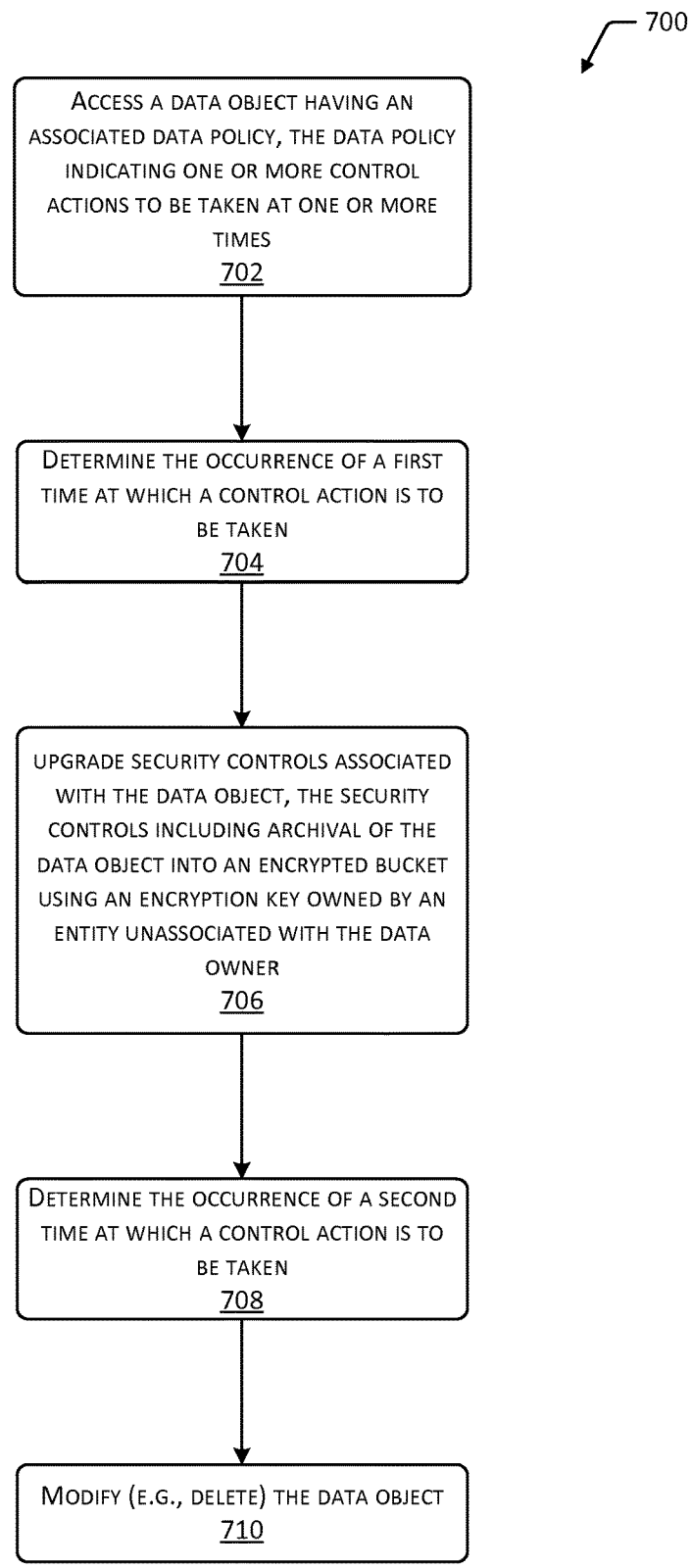
FIG. 7 is a flow diagram illustrating a method for modifying a data object based on the data policy associated with the data object.

FIG. 7 is a flow diagram 700 illustrating a method for modifying a data object 104 based on the data policy 102 associated with the data object 104. Block 702 accesses a data object 104 having an associated data policy 102. The data policy 102 may indicate one or more control actions 512 to be taken at one or more times with regard to the data object 104. For example, a data policy 102 may cause a data object 104 to be retained for a period of time, then deleted, archived, or secured. At subsequent times, additional control actions 512 may be taken. For example, a data object 104 may be provided with enhanced security controls, such as encryption and use of access credentials, for one year, and then deleted after the one year has lapsed.

Block 704 determines the occurrence of a first time at which a control action 512 is to be taken. For example, a data policy 102 may specify a fixed time, such as the end of a year, the end of a quarter, and so forth, at which a control action 512 is to be taken. In other implementations, a data policy 102 may include a length of time relative to the generation of a data object 104, such as ninety days after the data object 104 was created. In still other implementations, a data policy 102 may include a length of time relative to access to the data object 104, such as thirty days after the most recent access to the data object 104. In yet other implementations, a data policy 102 may include a length of time between accesses to a data object 104 (e.g., an access frequency). If the frequency at which a data object 104 is accessed reaches a certain rate or falls below a certain rate, one or more control actions 512 may be taken.

Block 706 undertakes a first control action 512 by upgrading security controls associated with the data object 104. For example, upgrading the security controls may include archiving the data object 104 into an encrypted container (e.g., a bucket). The corresponding decryption key that may be used to decrypt the encrypted container or data object 104 may be owned by an entity unassociated with the owner of the archived data object 104. By restricting decryption of the data object 104 to use of a decryption key not associated with the data owner, the data object 104 may be retained for an extended period of time, or even indefinitely, while minimizing security risks associated with the data object 104. For example, while the data object 104 is archived, neither the data owner nor any data consumers 106 may decrypt the data object 104 without the corresponding key. A third-party custodian associated with the key may also lack access to the data object 104, such as due to required certificates or other access credentials. If a future need for the archived, encrypted data object 104 is determined, the data owner may coordinate with the third-party custodian to decrypt the data object 104 for access. Other cryptographic operations, such as hashing, or other access controls, such as digital certificates, may also be used. The means to decrypt or access the data object 104 may be associated with the third-party custodian.

Block 708 determines the occurrence of a second time at which a subsequent control action 512 is to be undertaken. For example, a data policy 102 may cause a data object 104 to be archived or secured for a first period of time, and then cause a subsequent control action 512 to be taken at a later time. Block 710 modifies (e.g., deletes) the data object 104 responsive to the occurrence of the second time.

Figure 8:
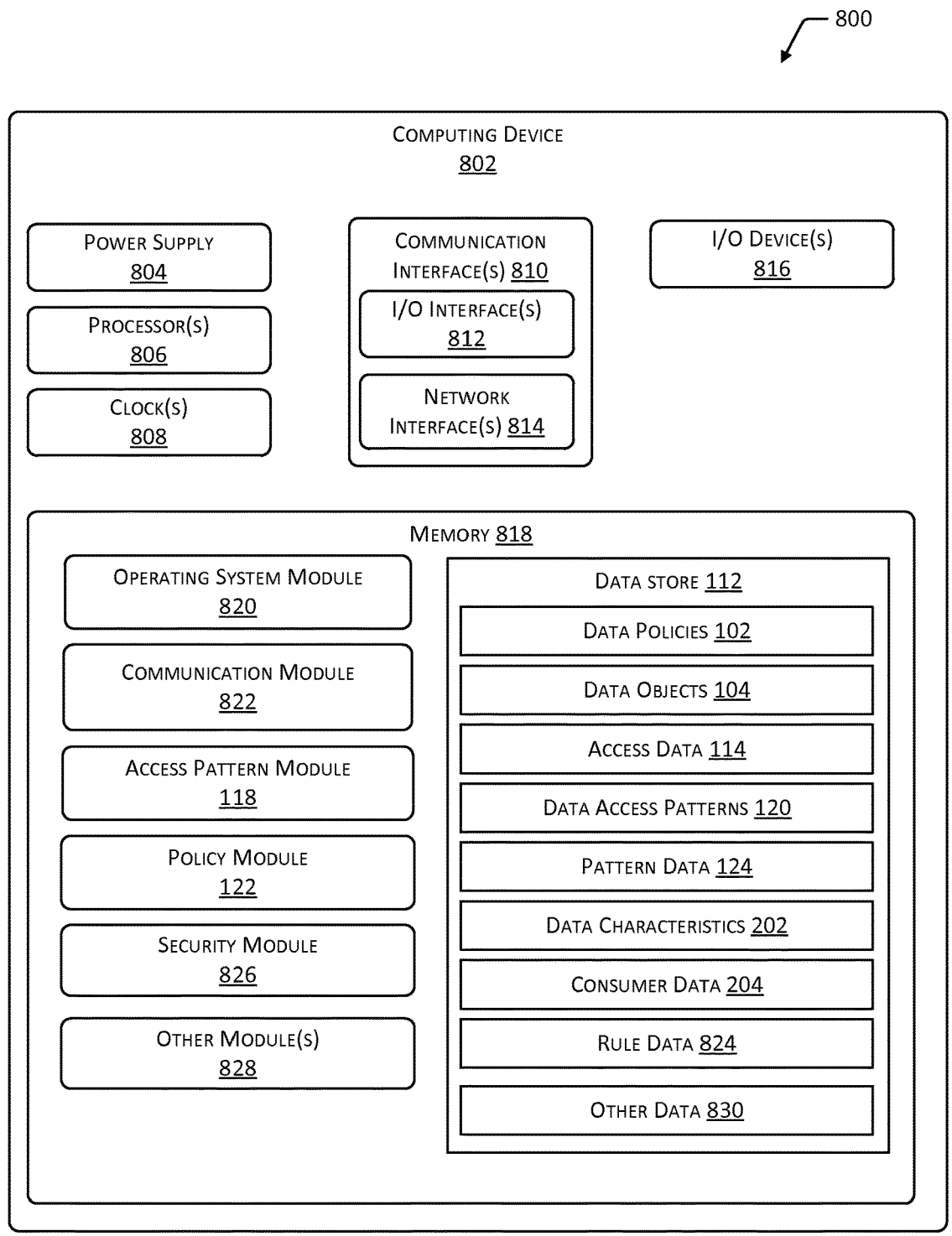
FIG. 8 is a block diagram illustrating a computing device within the scope of the present disclosure.

FIG. 8 is a block diagram 800 illustrating a computing device 802 within the scope of the present disclosure. The computing device 802 may include one or more policy determination servers 116, data management servers 110, devices associated with data consumers 106, or other devices in communication therewith. As described previously, one or more of the functions discussed with regard to the policy determination server 116 may be performed by the data management server(s) 110 or devices associated with data consumers 106. Similarly, one or more of the functions discussed with regard to the data management server(s) 110 or devices associated with the data consumers 106 may be performed by one or more policy determination servers 116. Any type of computing device 802 and any number of networked computing devices may perform the implementations described herein.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, determine the time at which a data object 104 is accessed, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input device or output device associated with the computing device 802. For example, I/O devices 816 may include touch sensors, keyboards, mouse devices, microphones, image sensors (e.g., cameras), scanners, displays, speakers, haptic devices, printers, and so forth. In some implementations, the I/O devices 816 may be physically incorporated with the computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks including local area networks (LANs), wireless LANs, wide area networks (WANs), wireless WANs, and so forth. For example, the network interfaces 814 may include devices compatible with Ethernet, Wi-Fi, Bluetooth, ZigBee, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 112 and one or more of the following modules may also be stored in the memory 818. The modules may be executed as foreground applications, background tasks, daemons, and so forth. The data store 112 may use a flat file, database, linked list, tree, executable code, script, or other data structure to store information. In some implementations, the data store 112 or a portion of the data store 112 may be distributed across one or more other devices including other computing devices 802, network attached storage devices, and so forth.

A communication module 822 may be configured to establish communications with one or more other computing devices 802, such as the policy determination server 116, the data management server 110, and computing devices 802 associated with data consumers 106. The communications may be authenticated, encrypted, and so forth.

The memory 818 may store the access pattern module 118. The access pattern module 118 may determine access data 114 when a request 108 to access a data object 104 is received by one or more computing devices 802. As access data 114 for a data object 104 is received over time, the access pattern module 118 may determine a data access pattern 120 for the data object 104. In some implementations, the access pattern module 118 may modify existing data access patterns 120. For example, a modification in the data characteristics 202 of the data object 104 or the code or deployment status of services accessing the data object 104 may affect future accesses to the data object 104. If the future accesses deviate from the data access pattern 120, the access pattern module 118 may replace or modify the data access pattern 120 based on access data 114 determined from recent accesses to the data object 104.

The memory 818 may also store the policy module 122. The policy module 122 may access pattern data 124 and determine correspondence between the data access patterns 120 of data objects 104 and those stored as pattern data 124. Correspondence between the data access pattern 120 of a data object 104 and a particular data access pattern 120 of the pattern data 124 may indicate that the data policies 102 stored in association with the particular data access pattern 120 of the pattern data 124 may be suitable for use with the data object 104. The policy module 122 may also access data characteristics 202 of the data object 104, consumer data 204 associated with one or more data consumers 106, and rule data 824 indicative of one or more rules that may be applicable to the data object 104. Based on one or more of the correspondence between the data access pattern 120 of a data object 104 and the pattern data 124, the data characteristics 202, the consumer data 204, or the rule data 824, the policy module 122 may determine one or more data policies 102 suitable for use with the data object 104. In some implementations, the policy module 122 may be used to generate policy recommendations 126 to be provided to a data owner. The policy module 122 may further receive user input 410 indicative of a data policy 102. The policy module 122 may additionally associate a selected data policy 102 with a data object 104. In other implementations, the policy module 122 may automatically associate a data policy 102 with a data object 104 in the absence of user input 410. In some implementations, the policy module 122 may also be used to execute one or more data policies 102. For example, the policy module 122 may determine one or more times indicated by a data policy 102 and cause one or more corresponding control actions 512 to be taken with regard to a data object 104. In other implementations, a separate module may be used to execute data policies 102.

The memory 818 may additionally store a security module 826. The security module 826 may determine access credentials associated with one or more data consumers 106. For example, responsive to receipt of a request 108 to access a data object 104, the security module 826 may determine the access credentials used to access the data object 104. The security module 826 may then attempt to determine those access credentials from the request 108 or from the data consumer 106 providing the request 108. The security module 826 may grant access to the data object 104 based on one or more of the access credentials associated with the data consumer 106, the content of the request 108, or the IP address, MAC address, or other identifier associated with the data consumer 106.

In some implementations, the security module 826 may determine correspondence between a request 108 to access a data object 104 and the data access pattern 120 associated with that data object 104. If the correspondence between the request 108 and the data access pattern 120 is less than a threshold correspondence value, this determination may indicate that the request 108 is anomalous. The security module 826 may prevent access to the data object 104 via a control action 512, generate an alert notification 508, or both.

In some implementations, the security module 826 may also be used to encrypt or decrypt a data object 104 and to modify security controls associated with the data object 104. For example, a data policy 102 may be used to cause modification to a security control of a data object 104 at a particular time. Continuing the example, as described in FIG. 7, one security control may include archiving the data object 104 in an encrypted container using an encryption key associated with a third-party entity.

Other modules 828 may also be present in the memory 818. For example, encryption modules may be used to encrypt and decrypt communications between computing devices 802. Authentication modules may be used to authenticate communications sent or received by computing devices 802. Reporting modules may be used to generate reports indicative of data policies 102 associated with data objects 104 and control actions 512 taken with regard to one or more data objects 104. Other modules 828 may also include a policy implementation module for causing one or more control actions 512 to be carried out with regard to data objects 104. Other modules 828 may further include a user interface module, which may receive and process user interactions associated with data objects 104, policy recommendations 126, and so forth.

Other data 830 within the data store 112 may include user input data, such as configurations and settings associated with computing devices 802. Other data 830 may include security data, such as encryption keys and schema, access credentials, and so forth. Other data 830 may also include threshold values associated with the policy module 122 and the security module 826. For example, correspondence between a data access pattern 120 of a data object 104 and the pattern data 124 may cause a subsequent action if the correspondence exceeds a threshold value. As another example, determination of a request 108 to access a data object 104 by the security module 826 may be disregarded if the correspondence between the request 108 and the data access pattern 120 for the data object 104 exceeds a threshold value. Threshold values may include maximum values, minimum values, ranges of values, and so forth.

In different implementations, different computing devices 802 may have different capabilities or capacities. For example, policy determination servers 116 may have significantly more processor 806 capability and memory 818 capacity compared to the processor 806 capability and memory 818 capacity of user devices that access data objects 104 via the data consumers 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors configured to execute the computer-executable instructions to:
access a data access log corresponding to a data object;
determine a first data access pattern from the data access log, wherein the first data access pattern is indicative of:
one or more services accessing the data object;
at least one time corresponding to access of the data object by the one or more services; and
one or more types of interaction corresponding to the access of the data object by the one or more services;
access pattern data including a plurality of data access patterns associated with a plurality of data policies;
determine that the first data access pattern of the data object matches at least a portion of a second data access pattern of the pattern data within a threshold value;
based on the first data access pattern matching the at least a portion of the second data access pattern, determine one or more data policies that correspond to the at least a portion of the second data access pattern of the pattern data;
output at least a subset of the one or more data policies;
receive user input indicative of a particular data policy;
associate the particular data policy with the data object, wherein the particular data policy includes one or more control actions to be taken with regard to the data object at one or more times;
determine an attempt to access the data object;
determine that the attempt to access the data objects deviates from a particular data access pattern that corresponds to the particular data policy by at least a threshold amount; and
in response to the attempt deviating from the particular data access pattern, modify one or more security features associated with the data object.

2. The system of claim 1, further comprising computer-executable instructions to:
determine one or more of a code or a deployment status corresponding to the one or more services; and
predict, based on the one or more of the code or the deployment status, an access frequency of the data object by the one or more services to be less than a threshold frequency of access;
wherein the one or more data policies indicate one or more of deletion of the data object, archival of the data object, or application of a security control to the data object.

3. The system of claim 1, wherein the pattern data further includes data characteristics associated with the plurality of data policies, the data characteristics being indicative of content or metadata, the system further comprising computer-executable instructions to:
determine one or more of the content or the metadata of the data object; and
determine correspondence between the one or more of the content or the metadata of the data object and the data characteristics of the pattern data;
wherein the one or more data policies that correspond to the at least a portion of the second data access pattern of the pattern data further correspond to the data characteristics.

4. The system of claim 1, further comprising computer-executable instructions to:
determine occurrence of at least one of the one or more times; and
perform at least one of the one or more control actions on the data object by applying one or more security controls to one or more of the data object or a data store storing the data object.

5. A method comprising:
determining, at a first time, a first portion of a first data access pattern of a data object, wherein the first data access pattern is indicative of one or more of: identifiers, times, or types of interaction corresponding to access of the data object;
accessing pattern data, wherein the pattern data associates a plurality of data access patterns with a plurality of data policies;
determining first correspondence between the first portion of the first data access pattern and at least one second data access pattern of the pattern data, wherein the first correspondence is less than a threshold confidence level;
determining, at a second time subsequent to the first time, a second portion of the first data access pattern of the data object;
determining second correspondence between the second portion of the first data access pattern and the at least one second data access pattern of the pattern data, wherein the second correspondence is greater than the threshold confidence level;
determining, based on the pattern data, a particular data policy of the plurality of data policies that is associated with the at least one second data access pattern;
based at least partially on the second correspondence, associating the particular data policy with the data object, wherein the particular data policy includes one or more control actions to be taken with regard to the data object at one or more times;
determining an attempt to access the data object;
determining that the attempt to access the data object deviates from a particular data access pattern associated with the particular data policy; and
performing a control action in response to the attempt deviating from the particular data access pattern.

6. The method of claim 5, further comprising:
determining that at least two data policies of the plurality of data policies of the pattern data correspond to the first portion and the second portion of the data access pattern of the data object;
outputting at least a subset of the plurality of data policies; and
receiving user input indicative of the particular data policy;
wherein the associating of the particular data policy of the pattern data with the data object is further based at least partially on the user input.

7. The method of claim 5, wherein the pattern data further includes data characteristics associated with the plurality of data policies, the data characteristics being indicative of content or metadata associated with data objects, the method further comprising:
- determining one or more of the content or the metadata of the data object; and
- determining correspondence between the pattern data and the one or more of the content or the metadata of the data object;
- wherein the associating of the particular data policy of the pattern data with the data object is further based at least partially on the correspondence between the pattern data and the one or more of the content or the metadata of the data object.

8. The method of claim 5, further comprising:
- determining one or more services that previously accessed the data object; and
- determining a modification to code corresponding to the one or more services, the modification removing a reference to the data object;
- wherein the particular data policy of the pattern data is associated with the data object based at least partially on the modification.

9. The method of claim 5, further comprising:
- determining one or more services that previously accessed the data object; and
- determining a modification to a deployment status corresponding to the one or more services, the modification removing deployment of the one or more services to access the data object;
- wherein the particular data policy of the pattern data is associated with the data object based at least partially on the modification.

10. The method of claim 5, further comprising:
- determining correspondence between the attempt and the particular data access pattern associated with the particular data policy; and
- determining that the correspondence is less than a threshold correspondence, wherein the determining that the attempt to access the data object deviates from the particular data access pattern is based at least in part on the correspondence being less than the threshold correspondence.

11. The method of claim 5, further comprising:
- determining a modification to one or more of: the data object, a data store storing the data object, or at least one service configured to access the data object;
- determining an access to the data object;
- determining correspondence between the access and the first data access pattern associated with the data object to be less than a threshold correspondence; and
- modifying the first data access pattern associated with the data object based on one or more of the modification or the access.

12. The method of claim 5, further comprising:
- determining occurrence of at least one of the one or more times; and
- performing at least one control action on the data object by:
  - applying a first security control to the data object; and
  - one or more of applying a second security control to the data object or archiving the data object.

13. A system comprising:
- one or more memories storing computer-executable instructions; and
- one or more hardware processors configured to execute the computer-executable instructions to:
  - determine a first data access pattern of a data object;
  - access pattern data that associates a plurality of data access patterns with a plurality of data policies;
  - determine correspondence between the first data access pattern of the data object and at least one second data access pattern of the pattern data, wherein the correspondence is within a threshold confidence value;
  - determine, based on the pattern data, one or more data policies that are associated with the at least one second data access pattern of the pattern data;
  - based on the correspondence between the first data access pattern and the at least one second data access pattern, associate a particular data policy of the one or more data policies with the data object, wherein the particular data policy includes one or more control actions to be taken with regard to the data object at one or more times;
  - determine an attempt to access the data object;
  - determine that the attempt deviates from a particular data access pattern associated with the particular data policy; and
  - perform a control action in response to the attempt deviating from the particular data access pattern.

14. The system of claim 13, further comprising computer-executable instructions to:
- determine a first portion of the first data access pattern;
- determine a first confidence value associated with first correspondence between the first portion and the at least one data access pattern of the pattern data to be less than the threshold confidence value;
- determine a second portion of the data access pattern; and
- determine a second confidence value associated with second correspondence between the pattern data and the second portion to exceed the threshold confidence value.

15. The system of claim 13, further comprising computer-executable instructions to:
- output the one or more data policies that correspond to the at least one data access pattern within the threshold confidence value;
- receive user input indicating the particular data policy and one or more of a length of time or the threshold confidence value; and
- determine one or more of: occurrence of the length of time or a particular confidence value to exceed the threshold confidence value.

16. The system of claim 13, further comprising computer-executable instructions to:
- determine correspondence between a third data access pattern for a second data object and the at least one second data access pattern of the pattern data;
- determine a type associated with the second data object based at least partially on one or more of content or metadata associated with the second data object; and
- associate a second particular data policy with the second data object based at least partially on the type.

17. The system of claim 13, wherein the computer-executable instructions to determine the first data access pattern associated with the data object include computer-executable instructions to:
- receive a data access log from one or more of a library or a data store associated with the data object; and determine the first data access pattern based at least partially on the data access log.

18. The system of claim 13, wherein the particular data policy further includes a threshold count of data objects, the system further comprising computer-executable instructions to:
  determine a count of data objects associated with the particular data policy to exceed the threshold count of data objects;
  determine occurrence of at least one of the one or more times; and
  perform a control action on at least one data object of the count of data objects by one or more of: deleting the at least one data object, archiving the at least one data object, or applying one or more security controls to the at least one data object.

19. The system of claim 13, wherein the particular data policy further includes device data indicative of one or more of: locations, device statuses, or networks, the system further comprising computer-executable instructions to:
  determine one or more of:
    a location associated with a data store storing the data object;
    a network accessible to the data store; or
    a device status of the data store;
  determine correspondence between the device data of the particular data policy and the one or more of the location, the network, or the device status; and
  perform a control action on the data object by one or more of: suppressing one or more indications of the data object in the data store from output, storing the data object external from the data store, or applying one or more security controls to one or more of the data store or the data object.

20. The system of claim 13, further comprising computer-executable instructions to:
  determine occurrence of at least one of the one or more times; and
  perform a control action on the data object by one or more of: revoking at least a subset of credentials configured to grant access to the data object; encrypting the data object, wherein a decryption key for decrypting the data object is stored remote from a data store storing the data object; or increasing a rate at which accesses to the data object are determined.

* * * * *

UNITED STATES PATENT AND TRADEMARK OFFICE
CERTIFICATE OF CORRECTION

PATENT NO. : 10,853,350 B1  
APPLICATION NO. : 14/838042  
DATED : December 1, 2020  
INVENTOR(S) : Nima Sharifi Mehr Page 1 of 1

It is certified that error appears in the above-identified patent and that said Letters Patent is hereby corrected as shown below:

On the Title Page

(56) References Cited  
U.S. Patent Pub No. 2015/0172321 ("Kirti") is missing

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*